(12) United States Patent
Watanabe

(10) Patent No.: US 11,411,744 B2
(45) Date of Patent: Aug. 9, 2022

(54) ENCRYPTION COMMUNICATION METHOD, INFORMATION PROCESSING APPARATUS, AND PROGRAM

(71) Applicant: NEC NETWORK AND SENSOR SYSTEMS, LTD., Fuchu (JP)

(72) Inventor: Yuusuke Watanabe, Tokyo (JP)

(73) Assignee: NEC Network and Sensor Systems, Ltd., Tokyo (JP)

( * ) Notice: Subject to any disclaimer, the term of this patent is extended or adjusted under 35 U.S.C. 154(b) by 226 days.

(21) Appl. No.: 16/615,543

(22) PCT Filed: May 23, 2018

(86) PCT No.: PCT/JP2018/019903
§ 371 (c)(1),
(2) Date: Nov. 21, 2019

(87) PCT Pub. No.: WO2018/216749
PCT Pub. Date: Nov. 29, 2018

(65) Prior Publication Data
US 2020/0169418 A1 May 28, 2020

(30) Foreign Application Priority Data
May 25, 2017 (JP) .............................. JP2017-103619

(51) Int. Cl.
*H04L 29/06* (2006.01)
*H04L 9/32* (2006.01)
(Continued)

(52) U.S. Cl.
CPC .......... *H04L 9/3263* (2013.01); *H04L 9/0844* (2013.01); *H04L 9/14* (2013.01);
(Continued)

(58) Field of Classification Search
CPC ....... H04L 9/3263; H04L 9/0844; H04L 9/14; H04L 9/3247; H04L 63/0435; H04L 63/0442; H04L 63/061
See application file for complete search history.

(56) References Cited

U.S. PATENT DOCUMENTS 5,761,305 A 6/1998 Vanstone et al.
6,636,968 B1 10/2003 Rosner et al.
(Continued)

FOREIGN PATENT DOCUMENTS

EP 2023525 A1 * 2/2009 ........... H04L 9/0838
JP 57141155 A * 9/1982 ............... H04K 1/00
(Continued)

OTHER PUBLICATIONS

International Search Report for PCT/JP2018/019903 dated Aug. 28, 2018 [PCT/ISA/210].

*Primary Examiner* — Sher A Khan
(74) *Attorney, Agent, or Firm* — Sughrue Mion, PLLC

(57) ABSTRACT

(A) An individual one of two or more terminals prepares a set of a first public key and a first private key. (B) One of the two or more terminals creates a set of a second public key and a second private key and distributes the second public key and the second private key to the other terminal(s). (C) One of the two or more terminals creates a shared key by using the corresponding first private key prepared in the (A) and the second public key shared in the (B). (D) A different terminal(s) of the two or more terminals creates a shared key used to communicate with the one terminal by using the second private key shared in the (B) and the first public key of the one terminal prepared in the (A). (E) The set of terminals performs an encryption communication(s) by using the shared keys.

11 Claims, 29 Drawing Sheets

(51) Int. Cl.
*H04L 9/08* (2006.01)
*H04L 9/40* (2022.01)
*H04L 9/14* (2006.01)

(52) U.S. Cl.
CPC ........ *H04L 9/3247* (2013.01); *H04L 63/0435* (2013.01); *H04L 63/0442* (2013.01); *H04L 63/061* (2013.01)

(56) References Cited

U.S. PATENT DOCUMENTS

| | | | |
|---|---|---|---|
| 7,606,369 B1 | 10/2009 | Schwenk | |
| 9,049,011 B1* | 6/2015 | Agrawal | H04L 9/0825 |
| 10,397,206 B2* | 8/2019 | McCallum | H04L 9/0841 |
| 10,826,875 B1* | 11/2020 | Kim | H04L 63/0442 |
| 2002/0037736 A1 | 3/2002 | Kawaguchi et al. | |
| 2005/0193203 A1* | 9/2005 | Freeman | H04L 63/18 |
| | | | 713/171 |
| 2006/0098819 A1* | 5/2006 | Zeng | H04L 9/3013 |
| | | | 380/44 |
| 2008/0013738 A1* | 1/2008 | Tajima | H04L 9/0852 |
| | | | 380/278 |
| 2008/0247546 A1* | 10/2008 | Kim | H04L 9/0838 |
| | | | 380/260 |
| 2009/0316910 A1* | 12/2009 | Maeda | H04L 9/0891 |
| | | | 380/279 |
| 2010/0054464 A1 | 3/2010 | Schwenk | |
| 2010/0172496 A1* | 7/2010 | Furukawa | H04L 9/3073 |
| | | | 380/46 |
| 2010/0180119 A1* | 7/2010 | Furukawa | H04L 9/0844 |
| | | | 713/180 |
| 2010/0199093 A1* | 8/2010 | Furukawa | H04L 9/0841 |
| | | | 380/278 |
| 2010/0226496 A1* | 9/2010 | Akiyama | H04L 9/3093 |
| | | | 380/28 |
| 2010/0228973 A1* | 9/2010 | Dancer | H04L 63/045 |
| | | | 713/168 |
| 2012/0254619 A1* | 10/2012 | Dhuse | H04L 9/0894 |
| | | | 713/176 |
| 2012/0314868 A1* | 12/2012 | Bernheim | H04L 9/0844 |
| | | | 380/279 |
| 2017/0207917 A1* | 7/2017 | Davis | H04L 63/061 |

FOREIGN PATENT DOCUMENTS

| | | | | |
|---|---|---|---|---|
| JP | 63054037 A | * | 3/1988 | ........... H04L 9/0844 |
| JP | 7-66803 A | | 3/1995 | |
| JP | 2000-502553 A | | 2/2000 | |
| JP | 2001057551 A | * | 2/2001 | ........... H04L 9/0866 |
| JP | 2002-041461 A | | 2/2002 | |
| JP | 2002-111679 A | | 4/2002 | |
| JP | 2002-527992 A | | 8/2002 | |
| JP | 2002-540721 A | | 11/2002 | |
| JP | 2003-318875 A | | 11/2003 | |
| JP | 2005-039868 A | | 2/2005 | |
| JP | 2007-060213 A | | 3/2007 | |
| JP | 2009-212689 A | | 9/2009 | |

* cited by examiner

FIG. 1
(1) CREATE KEYS
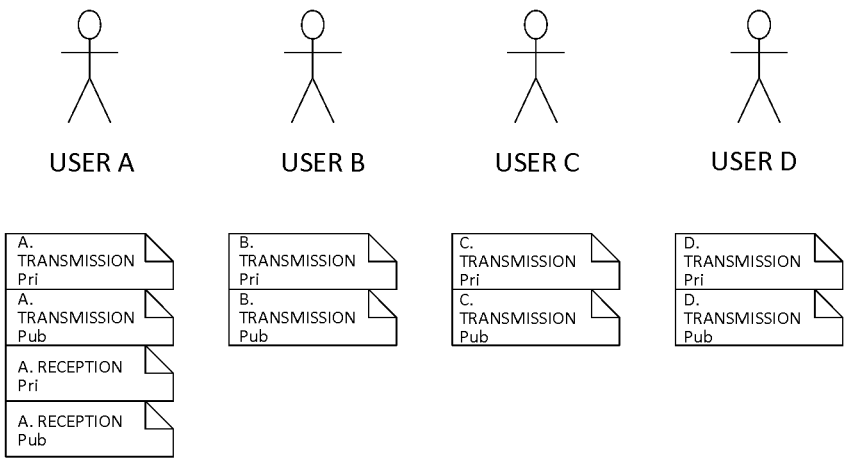
(2) DISTRIBUTE KEYS
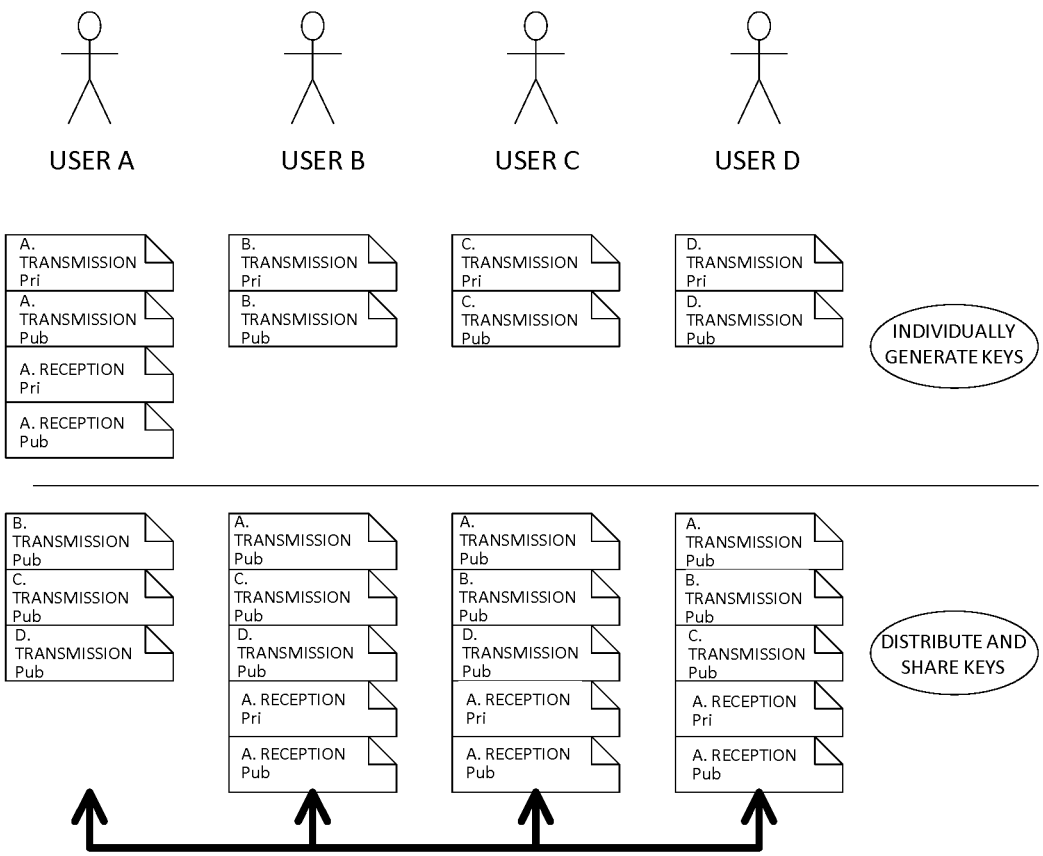

FIG. 2
(3) KEY SHARING
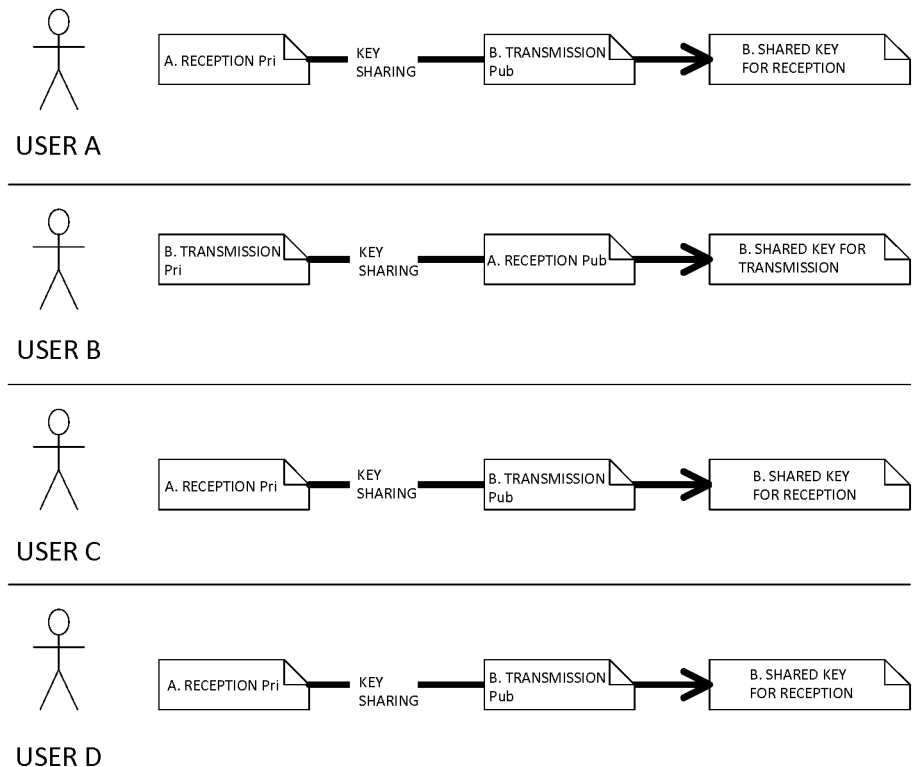
(4) ENCRYPTION/DECRYPTION
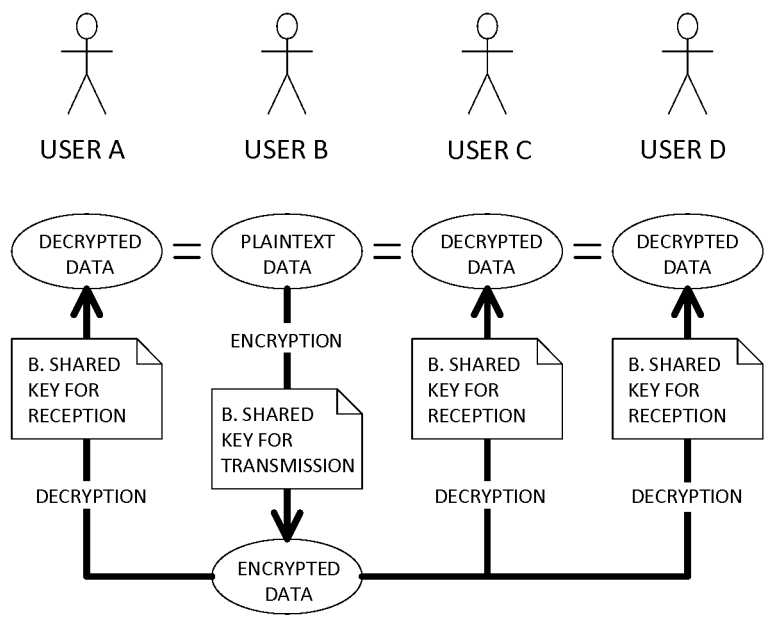

ENCRYPTION COMMUNICATION METHOD, INFORMATION PROCESSING APPARATUS, AND PROGRAM

REFERENCE TO RELATED APPLICATION

The present application is a National Stage of International Application No. PCT/JP2018/019903 filed on May 23, 2018, based upon and claims the benefit of the priority of Japanese patent application No. 2017-103619, filed on May 25, 2017, the disclosure of which is incorporated herein in its entirety by reference thereto.

FIELD

The present disclosure relates to an encryption communication method, an information processing apparatus, and a program. In particular, it relates to an encryption communication method, an information processing apparatus, and a program using a public key encryption method.

BACKGROUND

Patent Literature (PTL) 1 discloses a broadcast encryption communication method that securely enables broadcast encryption communications even when group members dynamically change. Specifically, PTL 1 describes that a process acquires a conversation key a encrypted with a private key A from an authentication server and requests a group management server to perform processing for the participation of the process by using the conversation key a. PTL 1 also describes that the group management server uses this conversation key a to encrypt a shared encrypted key g1 per group and delivers the shared encrypted key ga to the process.

PTL 2 discloses a chat system capable of protecting communication security even when a low reliability chat server is used. According to PTL 2, a key management server in this chat system includes channel private key creation means for creating a channel private key unique to an individual channel for encrypting/decrypting communication data exchanged via one or a plurality of channels. This key management server also includes encryption means for encrypting this channel private key, reception means for receiving a request for delivering the channel private key unique to the corresponding channel from another terminal apparatus, and delivery means for delivering the encrypted channel private key to the terminal apparatus in response to this delivery request.

Encryption communications can roughly be classified into two methods, which are a shared key encryption method and a public key encryption method. The following description will be made by using an example in which four users A to D perform encryption communications.

(1) Shared Key Encryption Method (Private Key Encryption Method)

FIG. 23 illustrates a procedure performed when encryption communications are performed with [shared key]. In this method, while a shared key needs to be distributed to and shared by all the users, this method is advantageous in that a 1-to-n operation can be performed and that, even if a user E participates in an ongoing communication, the user E can decrypt encrypted data generated by the user B. However, in this method, if the shared key is distributed online, measures against the risks of communication interception, etc. are needed. If the shared key is distributed offline, the key is recorded on media, and the media is distributed manually. However, the immediacy is poor in this way. In addition, measures against the risks of loss, theft, etc. are also needed.

(2) Public Key Encryption Method (Asymmetric Key Encryption Method)

The following methods are possible when encryption communications are realized by public key encryption. Hereinafter, among the keys used in public key encryption, an individual public key will be denoted as [Pub], and an individual private key will be denoted as [Pri]. In addition, a public key and a private key of a user X will be denoted as [X. Pub] and [X. Pri], respectively.

(2-1) Encryption with [Pri] of Transmitting User/Decryption with [Pub] of Transmitting User FIG. 24 illustrates a procedure performed when encryption communications are performed with a key of a user who transmits data. As illustrated in FIG. 24, the user A who transmits data distributes his/her own public key A. Pub to the transmission peers. This method is advantageous in that a 1-to-n operation can be performed and that, even if a user E participates in an ongoing communication, since the user E can acquire the public key of the user A, the user E can decrypt encrypted data generated by the user A. Since A. Pub is a key to be disclosed to the outside, if the key data is distributed online, no measures need to be taken against the risk of communication interception. However, if A. Pub is intercepted along with the data encrypted with Pri, the communication data can be decrypted. Thus, measures against the risk of communication interception are still needed. In addition, since the load of the processing for the public key encryption is heavy, this method is not suitable for data communication at high speed or encryption of a large amount of data.

(2-2) Encryption with [Pub] of Receiving User/Decryption with [Pri] of Receiving User FIGS. 25 and 26 illustrate a procedure performed when encryption communications are realized with keys of users who receive data. In this case, the users A to D exchange their own [Pub]. A transmitting user encrypts communication data with [Pub] of a transmission destination user (a transmission peer), and the receiving user decrypts the communication data with his/her own [Pri]. Since only the receiving user who has the corresponding [Pri] can decrypt the communication data, even if a set of [Pub] and communication data are intercepted, no measures against the risks need to be taken. However, when a transmitting user transmits data to a plurality of users, since the transmitting user needs to encrypt the data with [Pub] of the respective destination users, this method is not convenient. Namely, a 1-to-n operation cannot be performed. In addition, in this method, even if a user E who participates in an ongoing communication has acquired data transmitted from the user B, the user E cannot decrypt the data. When the user B wishes to transmit data to the user E, the user B needs to acquire the public key of the user E and encrypts the data with the public key. In addition, as in (2-1), since the load of the processing for the public key encryption is heavy, this method is not suitable for data communication at high speed or encryption of a large amount of data.

(2-3) Encryption/Decryption by Generating [Shared Key] with Public Key

FIGS. 27 and 28 illustrate a procedure performed when encryption communications are realized by using keys of both a user who transmits data and a user who receives the data. As illustrated in FIG. 27, the present operation is the same as that of the above (2-2) until the users A to D exchange their own [Pub]. In this method, as illustrated by the following expressions, an individual one of the users A to D performs DH key sharing by using the received [Pub] and his/her own [Pri] and generates keys based on shared key encryption. The DH key sharing signifies Diffie-Hellman key exchange, which is a method in which two users wishing to perform a communication exchange their own public keys alone, and each of the users creates a shared key from his/her own private key and the received public key. The DH key sharing is expressed as follows:

User A: key sharing ([A. Pri], [B. Pub])→[shared key]
User B: key sharing ([B. Pri], [A. Pub])→[shared key]

In FIG. 28, a shared key that X uses (encryption and decryption) in a communication between X and Y is denoted by "XY shared key", and a shared key that Y uses (encryption and decryption) in the same communication between X and Y is denoted by "YX shared key".

In this way, by adopting a hybrid method in which communication data is encrypted with shared key encryption, the problem of resources consumed each time communication data is encrypted can be solved. In addition, by performing the DH key sharing, a secure communication in which a different user(s) cannot perform decryption can be realized. However, in this method, too, to realize a one-to-many communication, a one-to-one communication needs to be performed in a round-robin fashion, resulting in poor convenience. In addition, there is a risk of attacks by third parties.

PTL 1: Japanese Patent Kokai Publication No. JP-7-66803A
PTL 2: Japanese Patent Kokai Publication No. JP-2005-39868A

SUMMARY

The following analysis has been given by the present inventor. It is possible to realize a communication by adding a signature key to the method in which [shared key] is generated by using a public key in the above (2-3) and encryption/decryption is performed.

Specifically, a protocol indicated by the following expressions is possible.

Certificate authority: addition of signature ([A. Pub], [certificate authority. certification Pri])
Certificate authority: addition of signature ([B. Pub], [certificate authority. certification Pri])
User A: verification of signature ([B. Pub], [certificate authority. certification Pub])→[B. Pub] is valid
User A: key sharing ([A. Pri], [B. Pub])→[shared key]
User B: verification of signature ([A. Pub], [certificate authority. certification Pub])→[A. Pub] is valid
User B: key sharing ([B. Pri], [A. Pub])→[shared key]

In the above protocol, addition of signature (X, Y) indicates that a signature using a private key Y is added to a public key X. In addition, verification of signature (X, Y) indicates that the validity (signature) of the public key X is verified by using a public key Y. In addition, key sharing (X, Y)→[shared key] indicates that a shared key is created by using a private key X and the public key Y of the communication peer.

As described above, by preparing a certificate authority (an external organization) and causing the certificate authority to add [certification key] for adding a signature, the users can prove their own identities, the risk of attacks by third parties is eliminated. However, even if the above change is made, a one-to-one communication still needs to be performed in a round-robin fashion in the method in (2-3). Thus, this method still has a problem with poor convenience.

It is an object of the present disclosure to provide an encryption communication method, an information processing apparatus, and a program that can contribute to solving the problem of resources consumed when communication data is encrypted and improving the convenience of the users.

According to a first aspect, there is provided an encryption communication method including (A) causing an individual one of two or more terminals to prepare a set of a first public key and a first private key. This encryption communication method also includes (B) causing one of the two or more terminals to create a set of a second public key and a second private key and distribute the second public key and the second private key to the other terminal(s). This encryption communication method also includes (C) causing one of the two or more terminals to create a shared key by using the corresponding first private key prepared in the (A) and the second public key shared in the (B). This encryption communication method also includes (D) causing a different terminal(s) of the two or more terminals to create a shared key used to communicate with the one terminal by using the second private key shared in the (B) and the first public key of the one terminal prepared in the (A). This encryption communication method also includes (E) causing the set of terminals to perform an encryption communication(s) by using the shared keys. The present method is tied to a particular machine, which is an information processing apparatus which includes a processor that performs encryption communications and a memory.

According to a second aspect, there is provided an information processing apparatus which serves as a terminal that can perform the above encryption communication method.

According to a third aspect, there is provided a server used in the above encryption communication method.

According to a fourth aspect, there is provided a non-transitory computer-readable storage medium that records a computer program for causing an information processing apparatus to perform the above encryption communication method. This program can be recorded in a computer-readable (non-transient) storage medium. Namely, the present disclosure can be embodied as a computer program product.

The meritorious effects of the present disclosure are summarized as follows.
According to the present disclosure, it is possible to achieve solving the problem of resources consumed when communication data is encrypted and improving the convenience of the users. Namely, the present disclosure can improve the convenience of the apparatus that performs hybrid encryption communications described in Background.

BRIEF DESCRIPTION OF DRAWINGS

FIG. 1 illustrates a procedure of an encryption communication method according to the present disclosure.

FIG. 2 is a diagram that follows FIG. 1.

MODES

Figure 3:
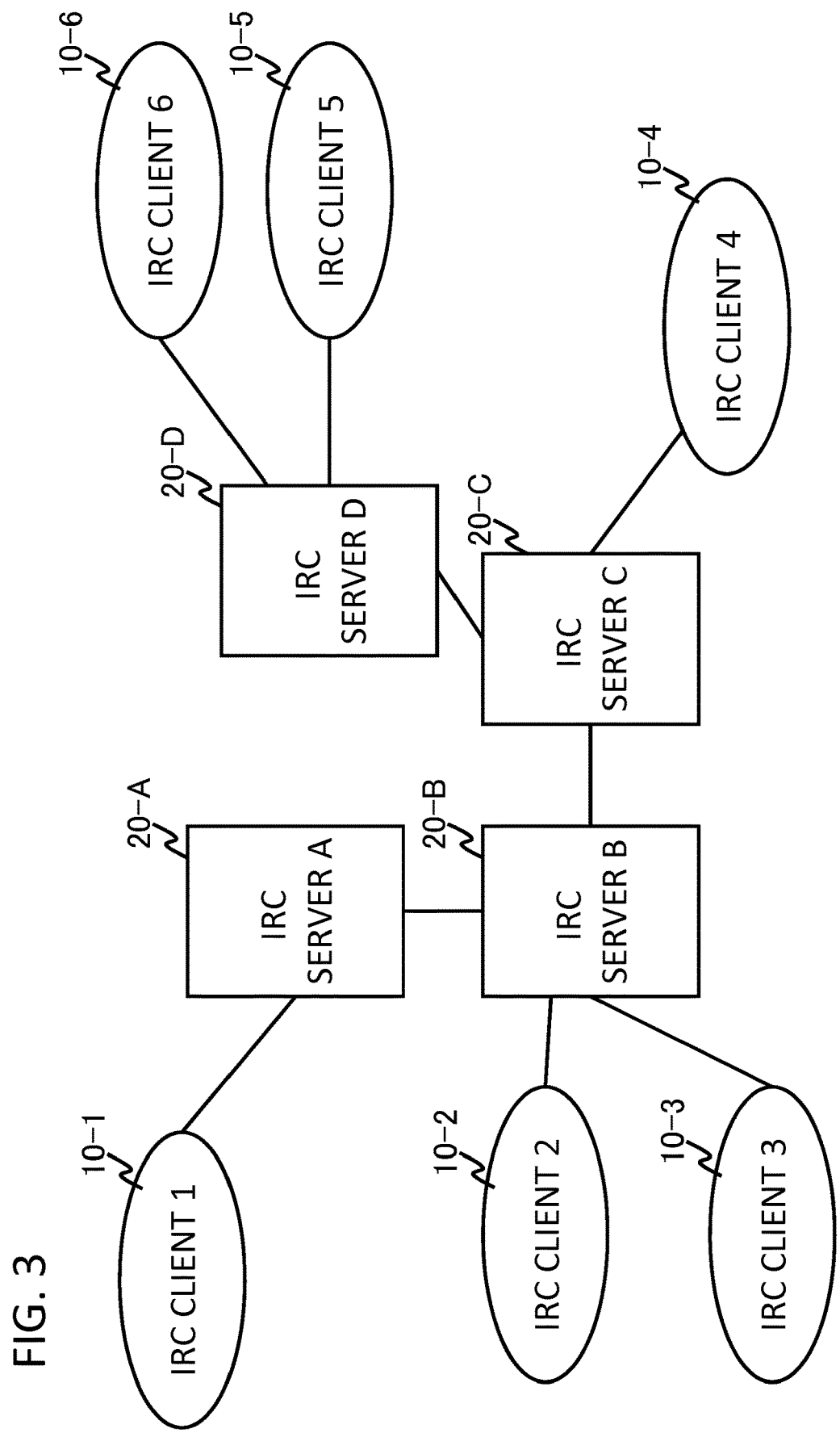
FIG. 3 illustrates a configuration of a chat system to which the present disclosure is applied.

First, an outline of an exemplary embodiment of the present disclosure will be described with reference to drawings. The reference characters that denote various elements in the following outline are merely used as examples for convenience to facilitate understanding of the present disclosure. Therefore, the reference characters are not intended to limit the present disclosure to the illustrated modes. An individual connection line between blocks in an individual drawing, etc., which the following description refers to, signifies both one-way and two-way directions. An individual arrow schematically illustrates the principal flow of a signal (data) and does not exclude bidirectionality. While not illustrated, a port or an interface exists at an input-output connection point in an individual block in an individual drawing.

As illustrated in FIGS. 1 and 2, an exemplary embodiment of the present disclosure can be realized as a 1-to-n encryption communication method (n is 1 or more) in which a plurality of users participate. First, as illustrated in FIG. 1, key information is distributed. First, (A) a plurality of users A to D prepare a public key for transmission (X. transmission Pub) and a private key for transmission (X. transmission Pri) in their own terminals. A public key for transmission (X. transmission Pub) and a private key for transmission (X. transmission Pri) correspond to a set of a first public key and a first private key.

Next, (B1) an arbitrary one (the user A in FIG. 1) of the users A to D creates a public key for reception (A. reception Pub) and a private key for reception (A. reception Pri) (see "(1) create keys" in FIG. 1). The public key for reception (A. reception Pub) and the private key for reception (A. reception Pri) correspond to a set of a second public key and a second private key.

Next, an individual one of the users A to D distributes his/her own public key for transmission (X. transmission Pub) to the other users. In addition, (B2) the user (the user A in FIG. 1) who has created the public key for reception (A. reception Pub) and the private key for reception (A. reception Pri) distributes the created public key for reception (A. reception Pub) and private key for reception (A. reception Pri) to the other users. Any one of the various kinds of key distribution means described in Background may be used as the key distribution means. Consequently, an individual user holds the set of the public key for reception and the private key for reception (A. reception Pub and A. reception Pri) created by the certain user and the public keys for transmission (X. transmission Pub) of the other users (see "(2) distribute keys" in FIG. 1).

When the above preparation has been made, creation of shared keys and implementation of encryption communications illustrated in FIG. 2 can be performed. (C) First, an arbitrary one (the user B in FIG. 2) of the users A to D creates a B. shared key for transmission by using his/her own private key for transmission (B. transmission Pri) prepared in the (A) and the public key for reception (A. reception Pub) shared in the (B2). (D) Likewise, an individual one of the other users creates a B. shared key for reception used to communicate with the user B by using the private key for reception (A. reception Pri) and the public key for transmission (B. transmission Pub) of the user B shared in the (B1) and (B2). As a result, a shared key between the users B and A, the users B and C, and the users B and D is shared ((3) key sharing in FIG. 2).

Subsequently, encryption communications can be performed between the users B and A, the users B and C, and the users B and D by using the shared key for transmission and the shared key for reception. For example, as illustrated in the lower part in FIG. 2, the user B encrypts plaintext data with the B. shared key for transmission and transmits the encrypted data to the users A, C, and D. The users A, C, and D can decrypt the encrypted data received from the user B with the B. shared key for reception and acquire the decrypted data (the plaintext data) created by the user B.

As described above, the present disclosure realizes encryption communications in which a hybrid method of public key encryption and share key encryption is adopted. In particular, according to the present disclosure, as represented by the user B in (3) in FIG. 2, when a user encrypts data, the user can perform processing without being aware of the keys of the decryptors. Thus, the present disclosure is advantageous in that, when a user wishes to encrypt and transmit data to a plurality of users, the user does not need to perform different encryption per user (an advantage over the methods in FIGS. 25 to 28).

In addition, the above point signifies that a user participating in an ongoing communication can decrypt encrypted data by acquiring a set of the public key for reception and the private key for reception. Thus, the present disclosure is also applicable to exchange of private information between certain two parties temporally separated. This point will be described as the following second exemplary embodiment.

First Exemplary Embodiment

A protocol outline will be described before exemplary embodiments in which the present disclosure is applied to an internet relay chat (IRC) system are described. The present disclosure is suitably applicable in coordination with a certificate authority. In the present exemplary embodiment, [certification key] and [authentication key] are prepared in addition to the above [reception key] and [transmission key]. First, these keys will be described.

There are a public key (Pub) and a private key (Pri) for an individual one of [certification key], [authentication key], [reception key], [transmission key], etc. [certification key Pub] and [certification key Pri] are used as keys of a root certificate authority (a root CA), and the certificate authority adds a signature to necessary data by using the certification key Pri.

[authentication key Pub] and [authentication key Pri] are used as keys of an individual intermediate certificate authority (an intermediate CA), which is a certificate authority under the root certificate authority (the root CA), and an individual user creates and holds these keys. The certificate authority adds a signature to [authentication key Pub] by using its [certification key Pri].

Between [reception key Pub] and [reception key Pri], [reception key Pri] is used to decrypt data. A representative creates a set of [reception key Pub] and [reception key Pri], adds a signature by using his/her own [authentication key], and distributes the keys to the other users. Between [transmission key Pub] and [transmission key Pri], [transmission key Pri] is used to encrypt data. An individual user creates a set of [transmission key Pub] and [transmission key Pri]. Between these keys, an individual user adds a signature to [transmission key Pub] by using his/her own [authentication key] and distributes the key to the other users.

The keys are distributed as follows. An example in which keys are exchanged between the users A and B will be described. In the following description, addition of signature (X, Y) indicates that a signature using a private key Y is added to a public key X. In addition, verification of signature (X, Y) indicates that the validity (signature) of the public key X is verified by using a public key Y. In addition, key sharing (X, Y)→[shared key] indicates that a shared key is created by using a private key X and the public key Y of the communication peer.

(1) First, the certificate authority issues public key certificates that certify the validities of the public keys for authentication of the users A and B.
Certificate authority: addition of signature ([A. authentication Pub], [certificate authority. certification Pri])
Certificate authority: addition of signature ([B. authentication Pub], [certificate authority. certification Pri])
(2) The user A adds a signature to his/her own public key for reception and public key for transmission by using his/her own private key for authentication and transmits the keys to the user B. In addition, the user A verifies the public key for authentication of the user B by using the public key for certification of the certificate authority and checks the validity. In addition, the user A verifies the public key for authentication of the user B by using the public key for transmission of the user B and checks the validity.
User A: addition of signature ([A. reception Pub], [A. authentication Pri])
User A: addition of signature ([A. transmission Pub], [A. authentication Pri])
User A: verification of signature ([B. authentication Pub], [certificate authority. certification Pub])
→[B. authentication Pub] is valid
User A: verification of signature ([B. transmission Pub], [B authentication Pub])
→[B. transmission Pub] is valid
(3) Likewise, the user B adds a signature to his/her own public key for transmission by using his/her own private key for authentication and transmits the key to the user A. In addition, the user B verifies the public key for authentication of the user A by using the public key for certification of the certificate authority and checks the validity. In addition, the user B verifies the public key for reception and the public key for transmission of the user A by using the public key for authentication of the user A and checks the validity.
User B: addition of signature ([B. transmission Pub], [B. authentication Pri])
User B: verification of signature ([A. authentication Pub], [certificate authority. certification Pub])
→[A. authentication Pub] is valid
User B: verification of signature ([A. reception Pub], [A. authentication Pub])
→[A. reception Pub] is valid
User B: verification of signature ([A. transmission Pub], [A. authentication Pub])
→[A. transmission Pub] is valid
(4) By preparing a public key for authentication and a private key for authentication as described above and acquiring certificates from the certificate authority, an individual user can add his/her own signature to his/her own [reception key]/[transmission key] generated by him/herself. For example, since the user A can add a signature to [A. reception key Pub] generated by his/herself ([A. reception key Pub], [A. authentication Pri]), the user A can perform addition of a signature by him/herself without requesting the certificate authority and can transmit the key to the user B. In this way, according to the present exemplary embodiment, regarding the frequency of updating and (generation) of [reception key]/[transmission key], the frequency of requesting the certificate authority to add a signature can be reduced, and the convenience of the users can be improved.

Next, key sharing is performed by using [reception key] (a set of the second public key and the second private key) shared by the users and [transmission key] (a set of the first public key and the first private key) generated by an individual user, and shared keys used for shared key encryption are generated. For example, when shared keys are created by three users A to C, each of the users creates three shared keys.

User A: key sharing ([A. transmission key Pri], [reception key Pub])→A. shared key for transmission (S)

User A: key sharing ([reception key Pri], [B. transmission key Pub])→B. shared key for reception User A: key sharing ([reception key Pri], [C. transmission key Pub])→C. shared key for reception User B: key sharing ([B. transmission key Pri], [reception key Pub])→B. shared key for transmission User B: key sharing ([reception key Pri], [A. transmission key Pub]) A. shared key for reception (T)

User B: key sharing ([reception key Pri], [C. transmission key Pub])→C. shared key for reception User C: key sharing ([C. transmission key Pri], [reception key Pub])→C. shared key for transmission User C: key sharing ([reception key Pri], [A. transmission key Pub])→A. shared key for reception (U)

User C: key sharing ([reception key Pri], [B. transmission key Pub])→B. shared key for reception The users B and C can decrypt the data encrypted by the user A with the key (S) by using (T) and (U), respectively. In this case, when generating the key (S), the user A uses his/her own keys alone.

Thus, in the present exemplary embodiment, since an individual user can generate a shared key for transmission by using his/her own keys alone, the user can encrypt data without being aware of the other users (decryptors). As a result, since a one-to-one communication does not need to be performed in a round-robin fashion, the convenience of the users can be improved (see FIGS. 1 and 2).

[IRC System]

Next, a specific example in which the present disclosure is applied to a chat system based on an IRC method will be described. The IRC (Internet Relay Chat) is constituted as a client/server type system in which clients have many-to-many conversations via a server.

FIG. 3 illustrates a configuration of a chat system to which the present disclosure is applied. As illustrated in FIG. 3, the configuration includes a plurality of IRC servers 20-A to 20-D connected to each other and IRC clients 10-1 to 10-6, each of which is connected to one of the IRC servers 20-A to 20-D and has a conversation with a different IRC client(s).

Figure 4:
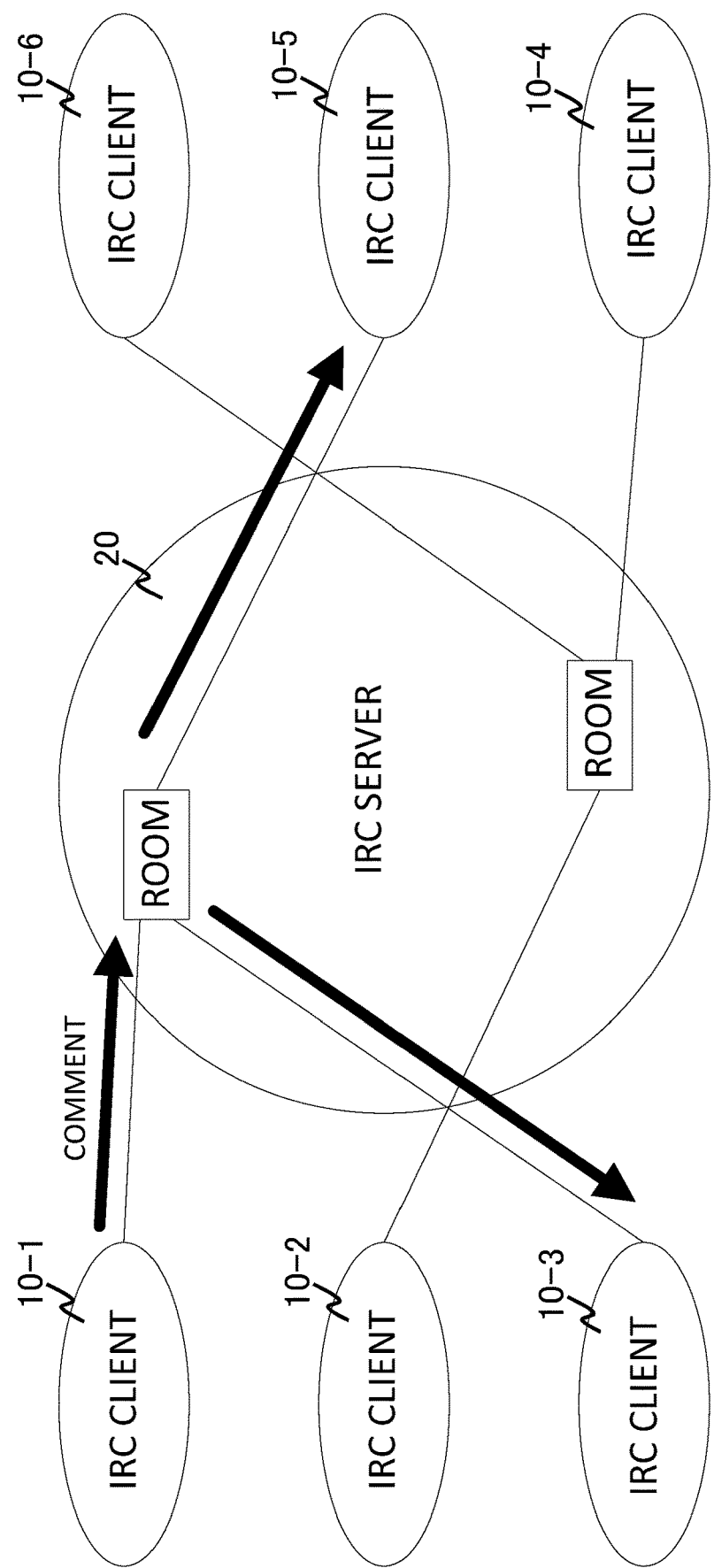
FIG. 4 illustrates a conversation space(s) (a chat room(s)) provided by the chat system in FIG. 3.

The IRC clients 10-1 to 10-6 view the IRC servers 20-A to 20-D as a single IRC server. FIG. 4 illustrates a conversation space(s) (a chat room(s)) provided by the chat system in FIG. 3. As illustrated in FIG. 4, the IRC server 20 (hereinafter, when the IRC servers 20-A to 20-D are not particularly distinguished from each other, any one of the IRC servers 20-A to 20-D will be expressed as the "IRC server 20") provides a conversation space(s) called a room(s) (a chat room(s)), and the IRC clients 10-1 to 10-6 enter a desired room(s) and have a conversation(s) in the room(s). For example, as illustrated in FIG. 4, the IRC server 20 forwards a comment of the IRC client 10-1 in a certain room to the IRC client 10-3 and the IRC client 10-5 in the certain room.

Figure 5:
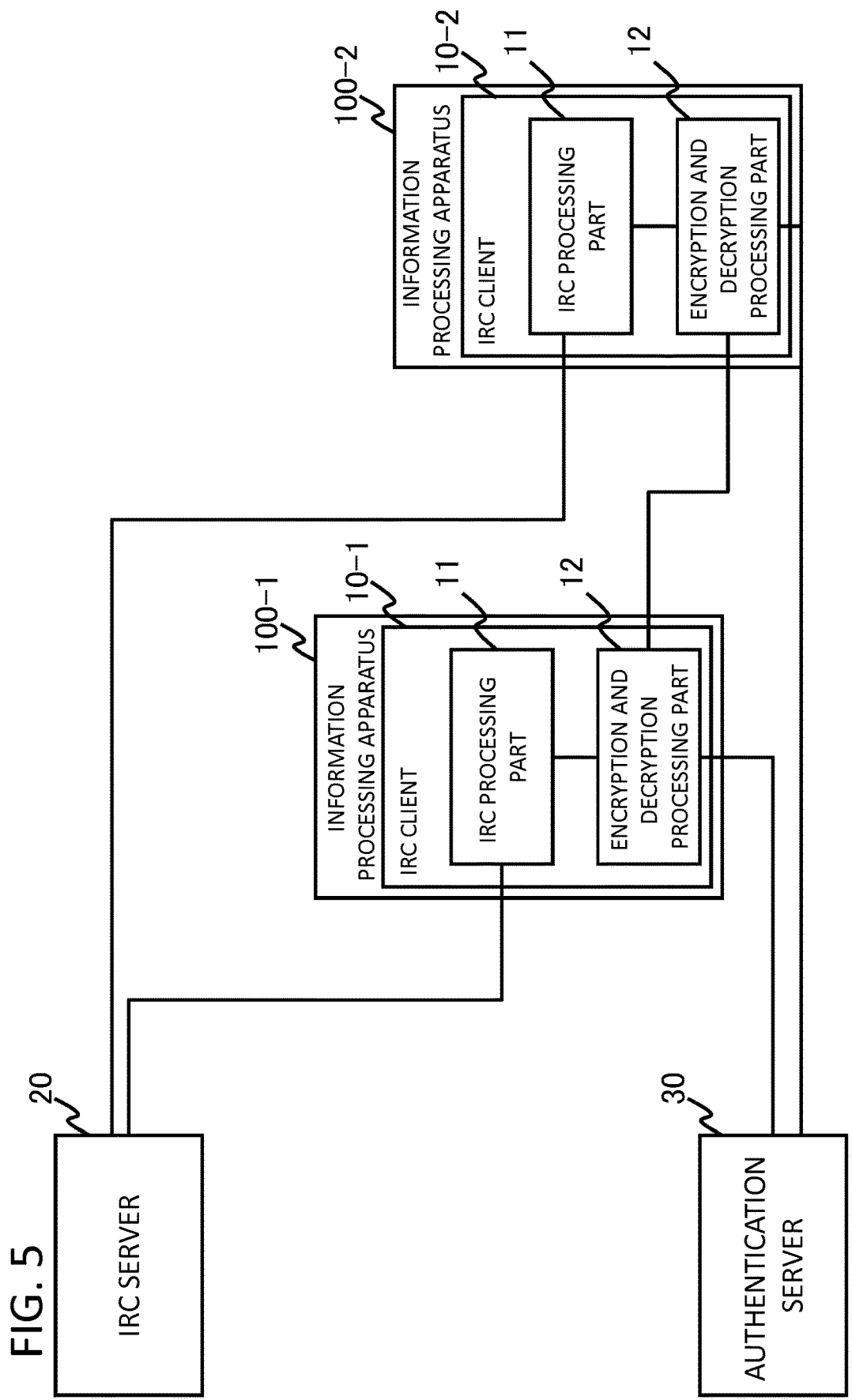
FIG. 5 illustrates a physical configuration of a chat system according to a first exemplary embodiment of the present disclosure.

According to the present exemplary embodiment, the contents of the comments exchanged in this room are kept secret. FIG. 5 illustrates a physical configuration of the chat system according to the present exemplary embodiment. As illustrated in FIG. 5, according to the present exemplary embodiment, an authentication server 30 is added in addition to the IRC server 20 and information processing apparatuses (terminals) 100-1 and 100-2 in which the IRC clients operate. An individual one of the IRC clients 10-1 and 10-2 includes an encryption and decryption processing part 12 that encrypts and decrypts the messages exchanged in the IRC, in addition to an IRC processing part 11 that realizes the chat function illustrated in FIGS. 3 and 4. The basic message flow is as follows. When a user of a certain IRC client makes a comment, for example, by entering text or saying something, the IRC processing part 11 transmits the content of the comment to the encryption and decryption processing part 12. The encryption and decryption processing part 12 encrypts the content of the comment and gives the content of the comment to the IRC processing part 11. The IRC processing part 11 transmits the encrypted data to the IRC server 20. The IRC server 20 transmits the received encrypted data to a different IRC client(s). The different IRC client(s) uses the encryption and decryption processing part 12 to decrypt the data received from the IRC server 20 and presents the decrypted data to the user.

Figure 6:
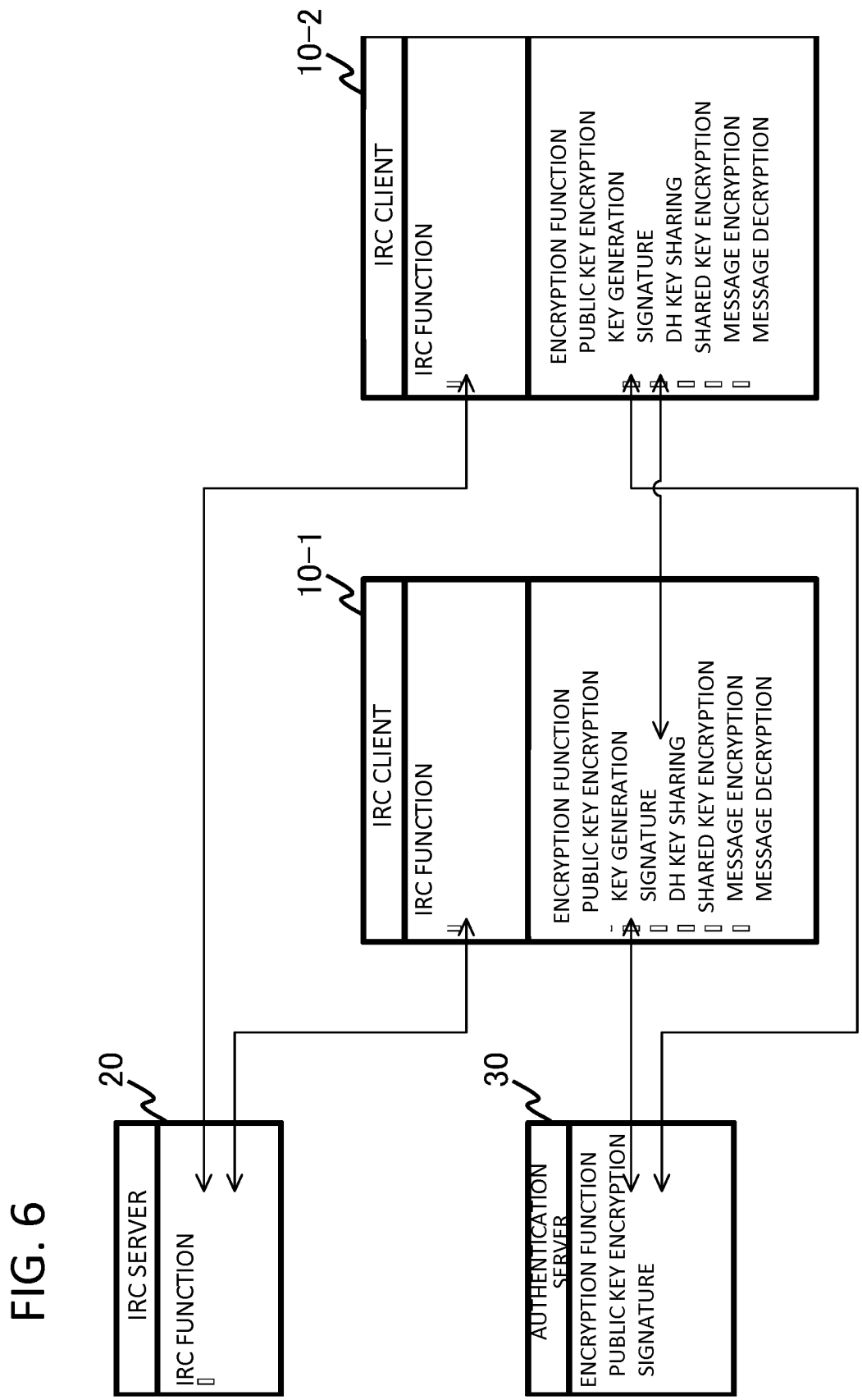
FIG. 6 illustrates a software configuration of the chat system according to the first exemplary embodiment of the present disclosure.

FIG. 6 illustrates a software configuration of the chat system according to the present exemplary embodiment. The IRC function of the IRC server 20 and the IRC functions (corresponding to the above IRC processing parts 11) of the IRC clients 10-1 and 10-2 are included in the IRC clients/servers illustrated in FIGS. 3 and 4. Each of the encryption functions of the IRC clients 10-1 and 10-2 in FIG. 6 corresponds to the above encryption and decryption processing part 12, which exchanges an encryption key with the authentication server 30 and a different IRC client, finally creates a shared key, and performs encryption and decryption of messages exchanged in the IRC (this operation will be described in more detail below). While only two IRC clients are illustrated for ease of description in the example in FIG. 5, three or more IRC clients may of course be used. Hereinafter, when the IRC clients are not particularly distinguished from each other, any one of the IRC clients will be expressed as an IRC client 10.

Next, an operation in which the above IRC clients 10, the IRC server 20, and the authentication server 30 perform a chat will be described. In the following description, both the IRC server 20 and the authentication server 30 will be expressed as an "A. server". In addition, the following description assumes that three IRC clients of a "B. client", a "C. client", and a "D. client" are used. The upper sections in the tables in FIGS. 7 to 19 illustrate information held by the individual entities and a room, and the lower sections illustrate processing performed by the individual entities. The information held by the individual entities is basically sectioned as "user name. (key name)+Pub/Pri". In addition, when "@" is added to information held by an entity, the information includes a signature created by using the key described after "@". For example, "B. authentication key Pub@A. certification key Pri" signifies the public key for authentication of the B. client to which a signature created by using the A. certification key Pri is added.

First, an operation in which a client enters a room and starts a chat will be described. The following description assumes that the user who has generated a room generates reception keys and that the lifetime of the reception keys is between generation of the room and elimination of the room. The lifetime of the transmission keys is between entering of the corresponding user into the room and leaving of the user from the room. Namely, when a user enters a room again, the transmission keys are updated and exchanged with a different user(s), again.

Figure 7:
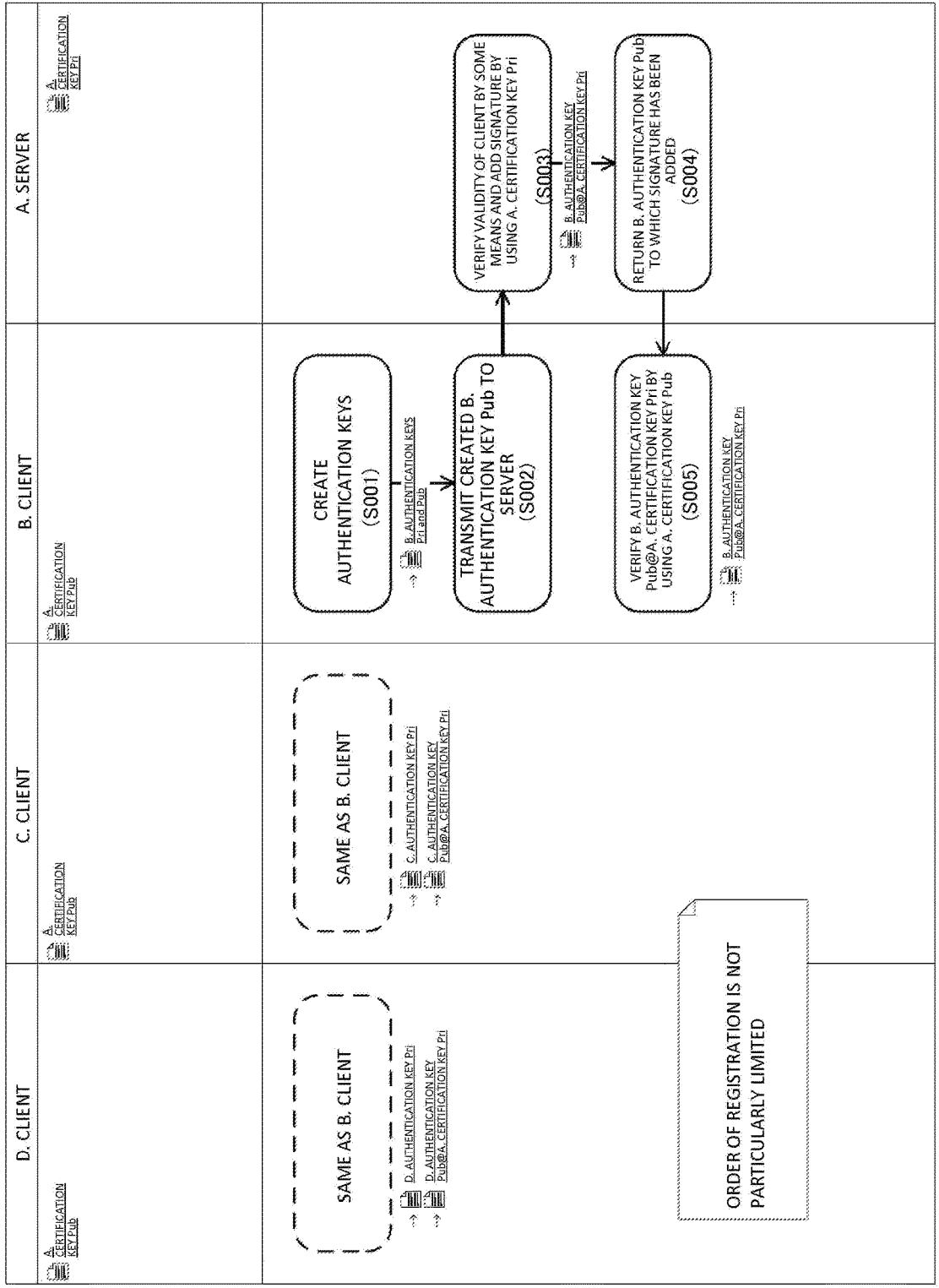
FIG. 7 illustrates an operation (registration of clients) according to the first exemplary embodiment of the present disclosure.

FIG. 7 illustrates an operation (registration of clients) according to the first exemplary embodiment of the present disclosure. As illustrated in FIG. 7, the B. client creates its own authentication keys (the authentication key Pri and the authentication key Pub) (step S001) and transmits the generated authentication key Pub to the A. server (step S002).

First, the A. server checks the validity of the B. client by some means (for example, a password, biological information, etc.) and adds a signature to the authentication key Pub of the client by using the certification key Pri (step S003). The A. server returns the authentication key Pub to which the signature has been added to the B. client (step S004).

The B. client verifies the authentication key Pub including the signature received from the server by using the certification key Pub of the server (S005). Each of the C. client and the D. client also performs the above operation and acquires the authentication key Pub including the signature (the order of registration is not particularly limited).

Figure 8:
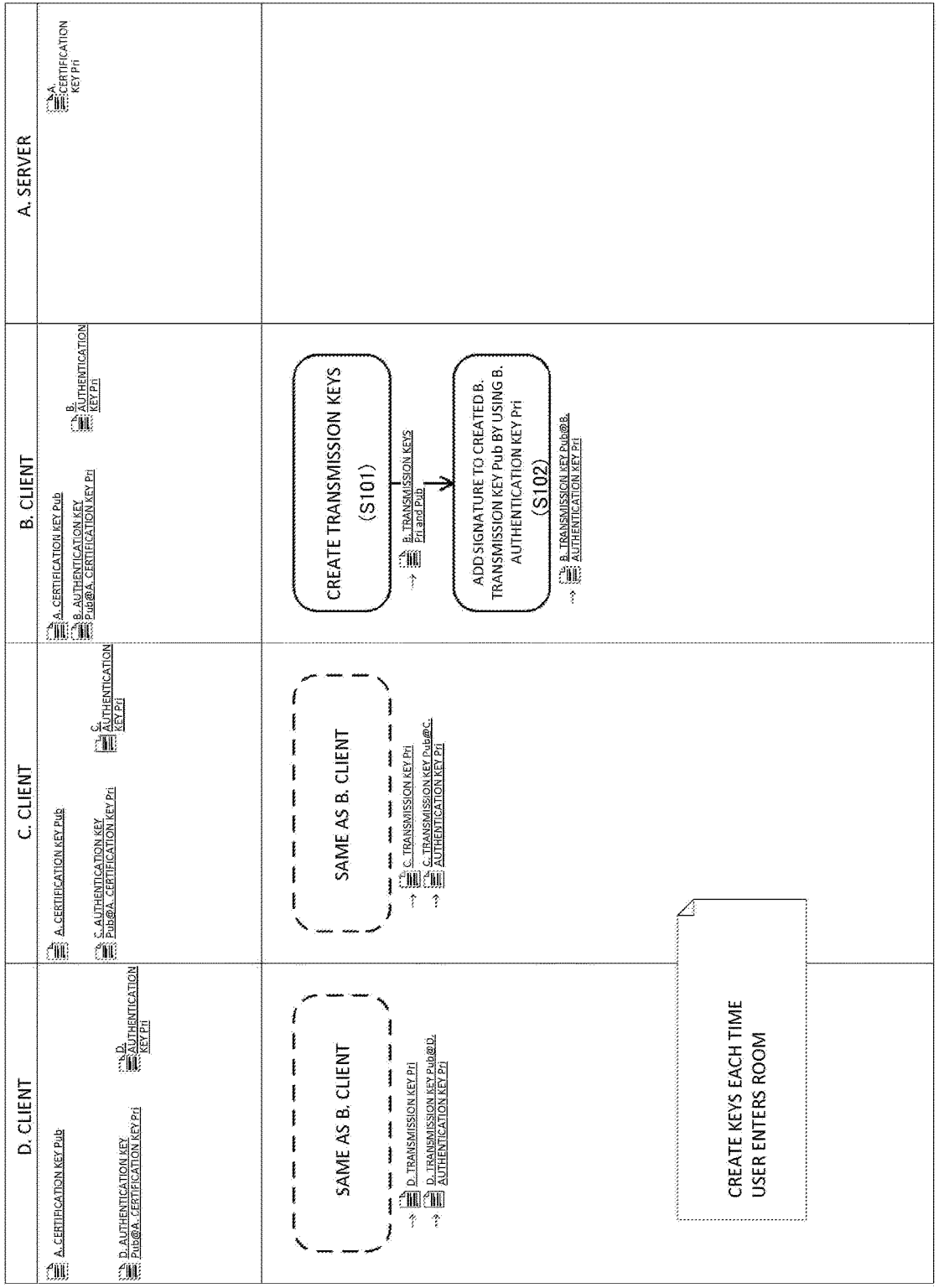
FIG. 8 illustrates an operation (creation of transmission keys) according to the first exemplary embodiment of the present disclosure.

FIG. 8 illustrates an operation (creation of transmission keys) according to the first exemplary embodiment of the present disclosure. As illustrated in FIG. 8, first, the B. client that has entered a room first creates its own transmission keys (its own transmission key Pri and transmission key Pub) (step S101). The B. client adds a signature to the created transmission key Pub by using the authentication key Pri (step S102). Each of the C. client and the D. client also creates its own transmission keys (its own transmission key Pri and transmission key Pub) and adds a signature to its own transmission key Pub by using its own authentication key Pri. Consequently, as illustrated in the upper section in FIG. 9, the individual client has prepared its own transmission key Pri and its own transmission key Pub to which a signature has been added.

Figure 9:
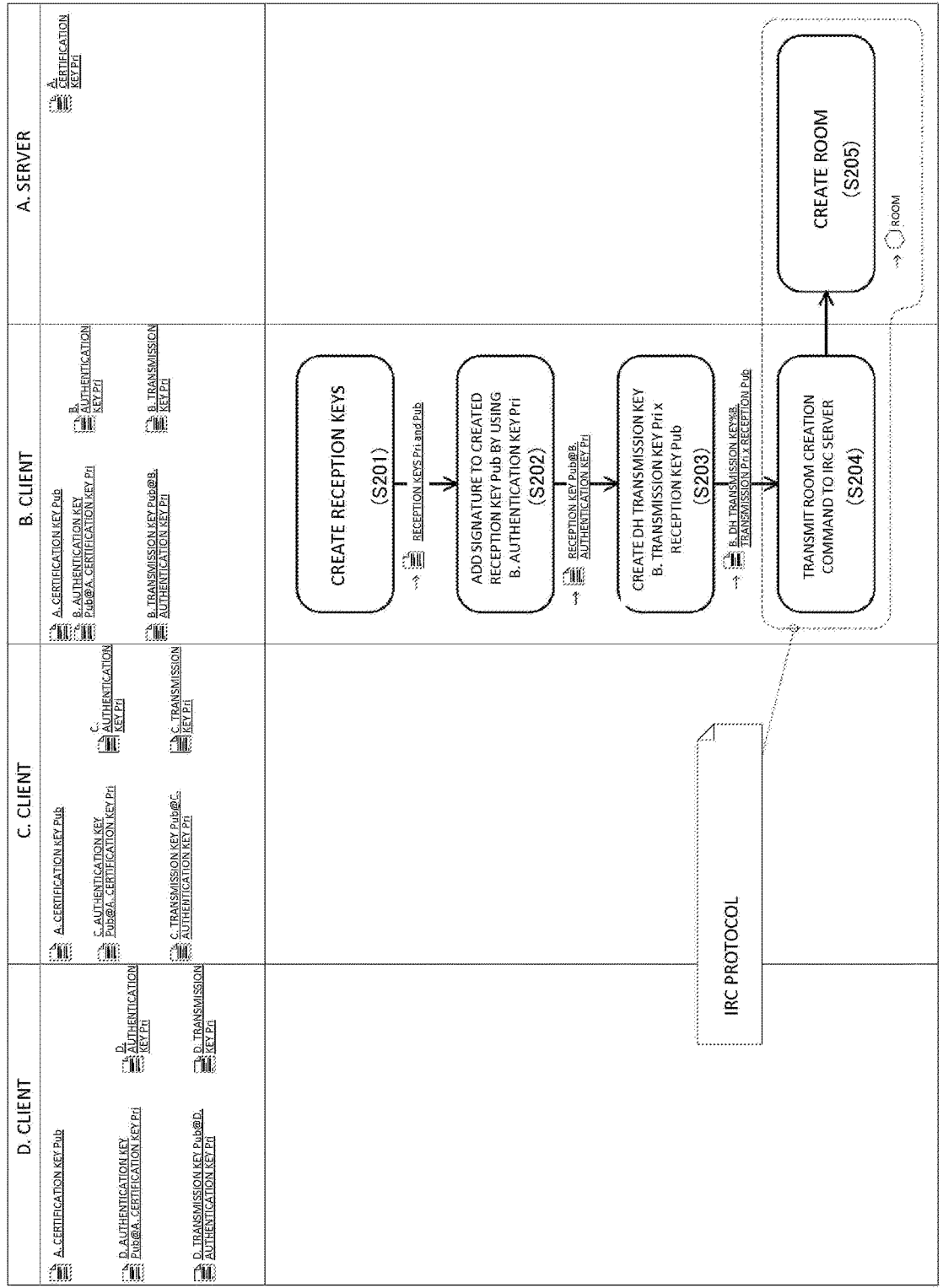
FIG. 9 illustrates an operation (creation of a room) according to the first exemplary embodiment of the present disclosure.

FIG. 9 illustrates an operation (creation of a room) according to the first exemplary embodiment of the present disclosure. As illustrated in FIG. 9, the B. client (parent) that generates a room creates reception keys (the reception Pri and the reception Pub) (step S201).

The B. client adds a signature to the created reception key Pub by using its own authentication key Pri (step S202). Next, the B. client creates a DH shared key by using the B. transmission key Pri and the reception key Pub (step S203). This DH shared key is used when the B. client (parent) encrypts its own message(s). The DH shared key will be expressed as "transmission key Pri x reception key Pub", for example.

After creating the DH shared key, the B. client transmits a room creation command to the IRC server (step S204). The A. server (the IRC server) creates a room based on the room creation command (step S205). These steps S204 and S205 are performed based on the IRC protocol. Since the B. client is the user who has created the room, the B. client will be expressed as "B. client (parent)".

Figure 10:
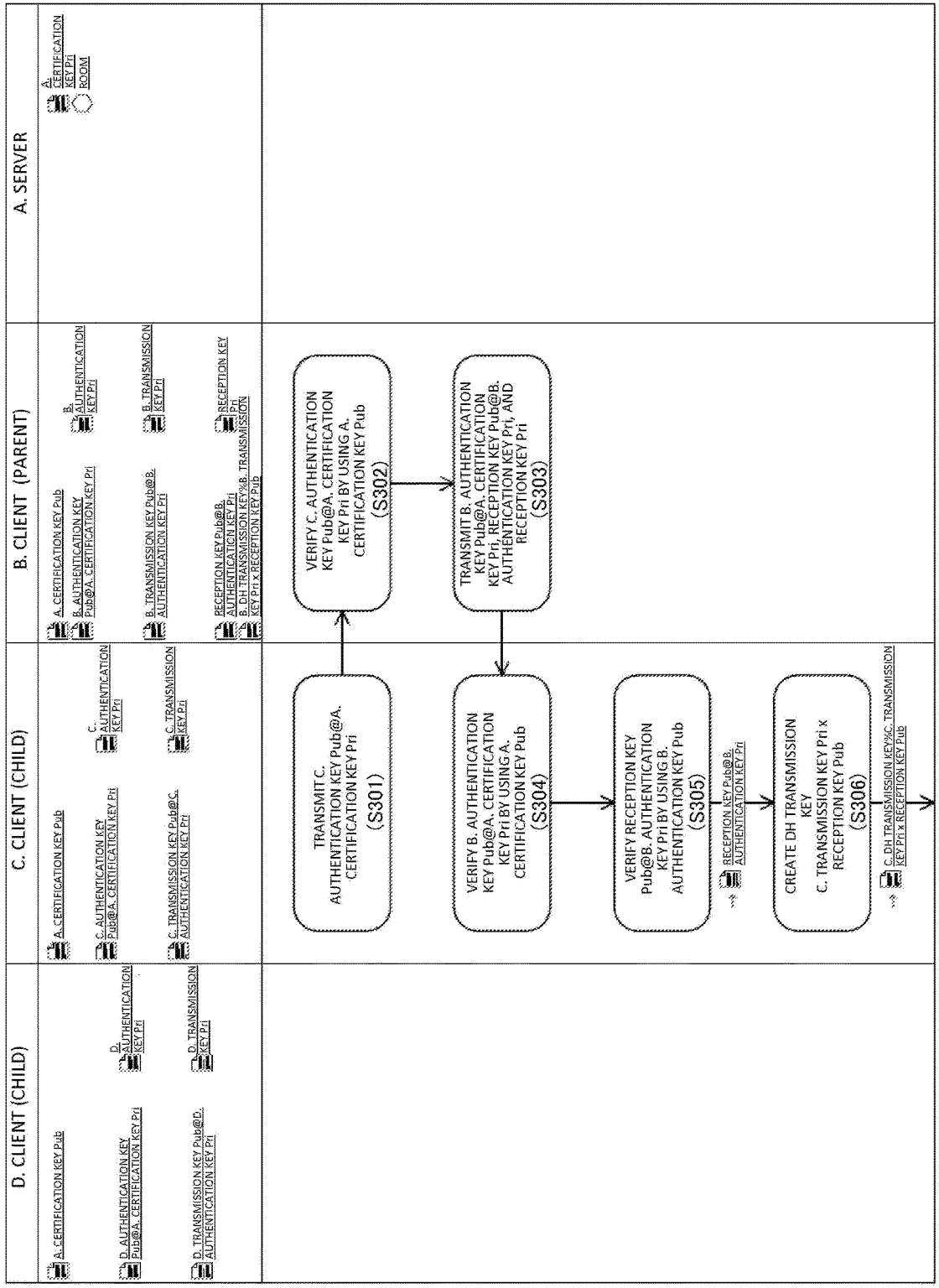
FIG. 10 illustrates an operation (participation-1) according to the first exemplary embodiment of the present disclosure.

FIG. 10 illustrates an operation (participation of the C. client-1) according to the first exemplary embodiment of the present disclosure.

As illustrated in FIG. 10, the C. client (child) transmits the C. authentication key Pub to which the signature of the certificate authority has been added to the B. client (parent) (step S301). The B. client (parent) verifies the C. authentication key Pub by using the certification key Pub of the certificate authority (step S302).

If the B. client (parent) successfully verifies the C. authentication key Pub, the B. client (parent) transmits the B. authentication key Pub to which the signature of the certificate authority has been added, the reception key Pub to which a signature created by using the B. authentication key Pri has been added, and the reception key Pri to the C. client (child) (step S303). The C. client (child) verifies the B. authentication key Pub by using the certification key Pub of the certificate authority (step S304).

If the C. client (child) successfully verifies the B. authentication key Pub, the C. client (child) verifies the reception key Pub to which a signature of the B. client (parent) has been added by using the authentication key Pub of the B. client (parent) (step S305). If the C. client (child) successfully verifies the reception key Pub, the C. client (child) creates a DH shared key (a shared key for transmission) by using the C. transmission key Pri and the reception key Pub (step S306). This DH shared key is used when the C. client (child) encrypts its own message(s).

Figure 11:
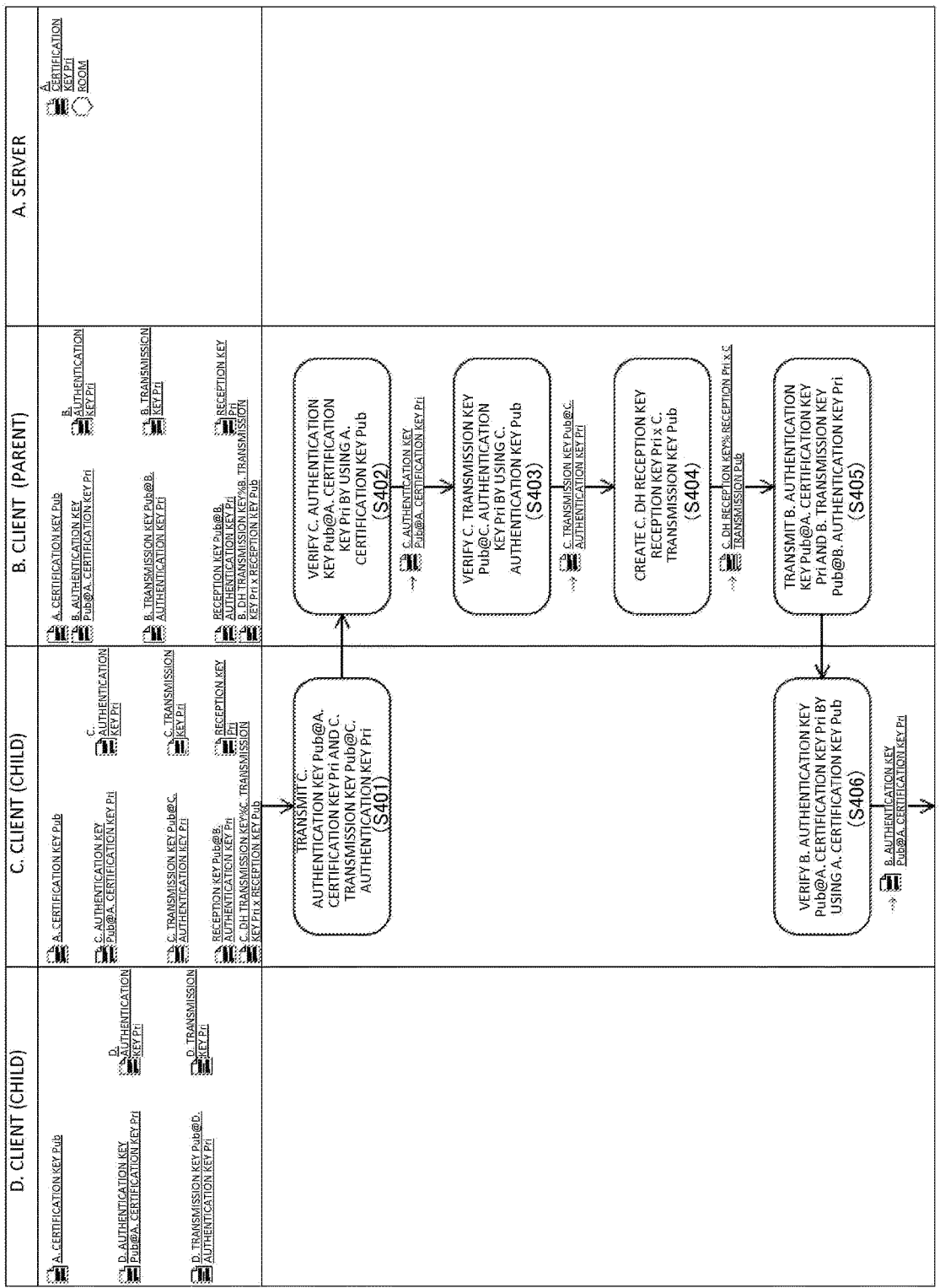
FIG. 11 illustrates an operation (participation-2) according to the first exemplary embodiment of the present disclosure.

FIG. 11 is a diagram that follows FIG. 10. As illustrated in FIG. 11, after creating the DH shared key (the shared key for transmission), the C. client (child) transmits the C. authentication key Pub to which the signature of the certificate authority has been added and the C. transmission key Pub to which the signature created by using the C. authentication key Pri has been added to the B. client (parent) (step S401). The B. client (parent) verifies the C. authentication key Pub by using the certification key Pub of the certificate authority (step S402).

If the B. client (parent) successfully verifies the C. authentication key Pub, the B. client (parent) verifies the C. transmission key Pub by using the C. authentication key Pub of the C. client (step S403). If the B. client (parent) successfully verifies the C. transmission key Pub, the B. client (parent) creates a DH shared key (a shared key for reception) by using the reception key Pri and the C. transmission key Pub (step S404). This DH shared key is used when the B. client (parent) decrypts a message(s) from the C. client (child).

After creating the DH shared key (the shared key for reception), the B. client (parent) transmits the B. authentication key Pub to which the signature of the certificate authority has been added and the B. transmission key Pub to which the signature created by using the B. authentication key Pri has been added to the C. client (child) (step S405). The C. client (child) verifies the B. authentication key Pub by using the certification key Pub of the certificate authority (step S406).

Figure 12:
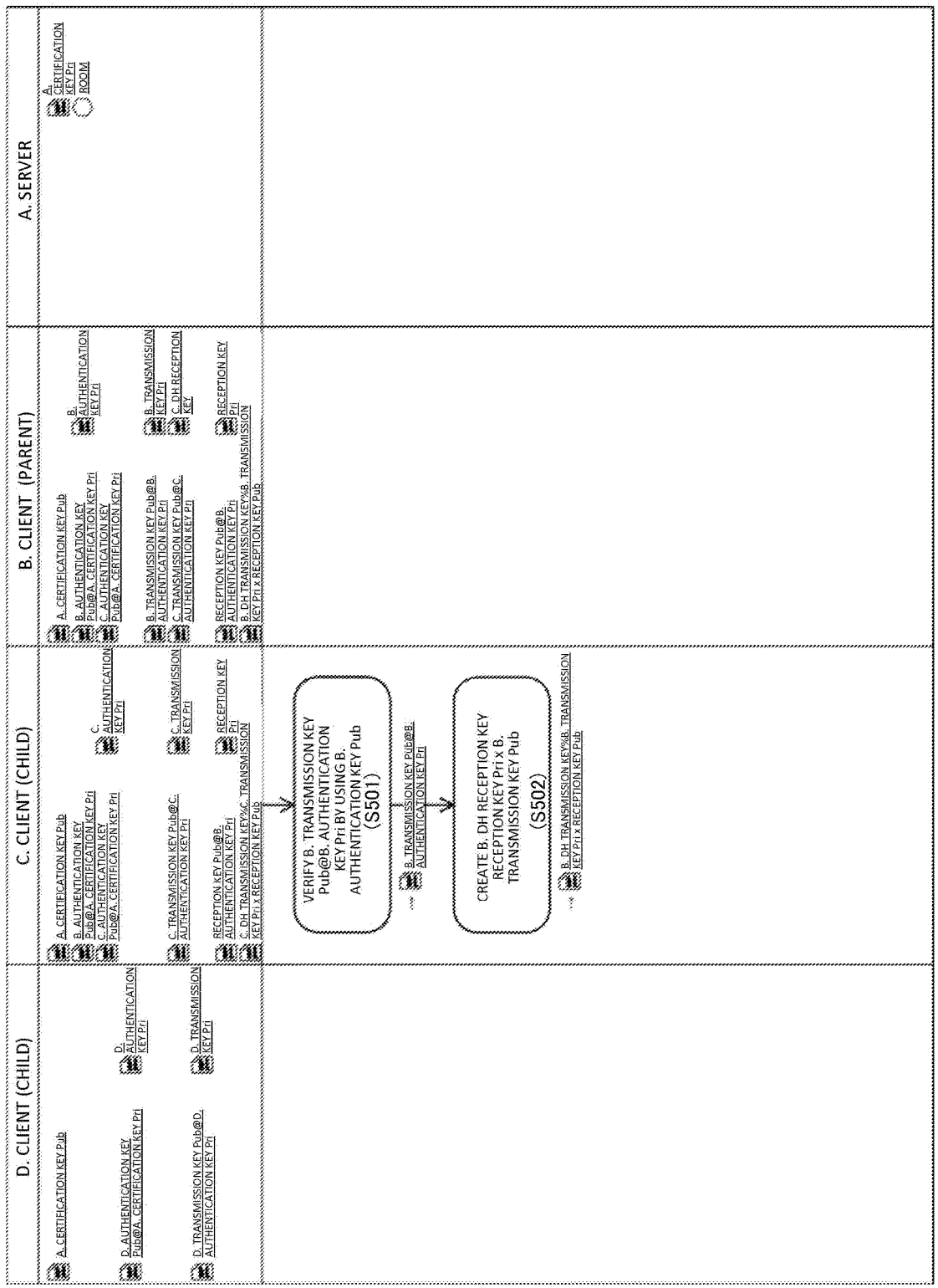
FIG. 12 illustrates an operation (participation-3) according to the first exemplary embodiment of the present disclosure.

FIG. 12 is a diagram that follows FIG. 11. As illustrated in FIG. 12, if the C. client (child) successfully verifies the B. authentication key Pub, the C. client (child) verifies the B. transmission key Pub by using the B. authentication key Pub of the B. client (parent) (step S501). If the C. client (child) successfully verifies the B. transmission key Pub, the C. client (child) creates a DH shared key (a shared key for reception) by using the reception key Pri and the B. transmission key Pub (step S502). The C. client (child) uses this DH shared key when decrypting a message(s) from the B. client (parent).

Figure 13:
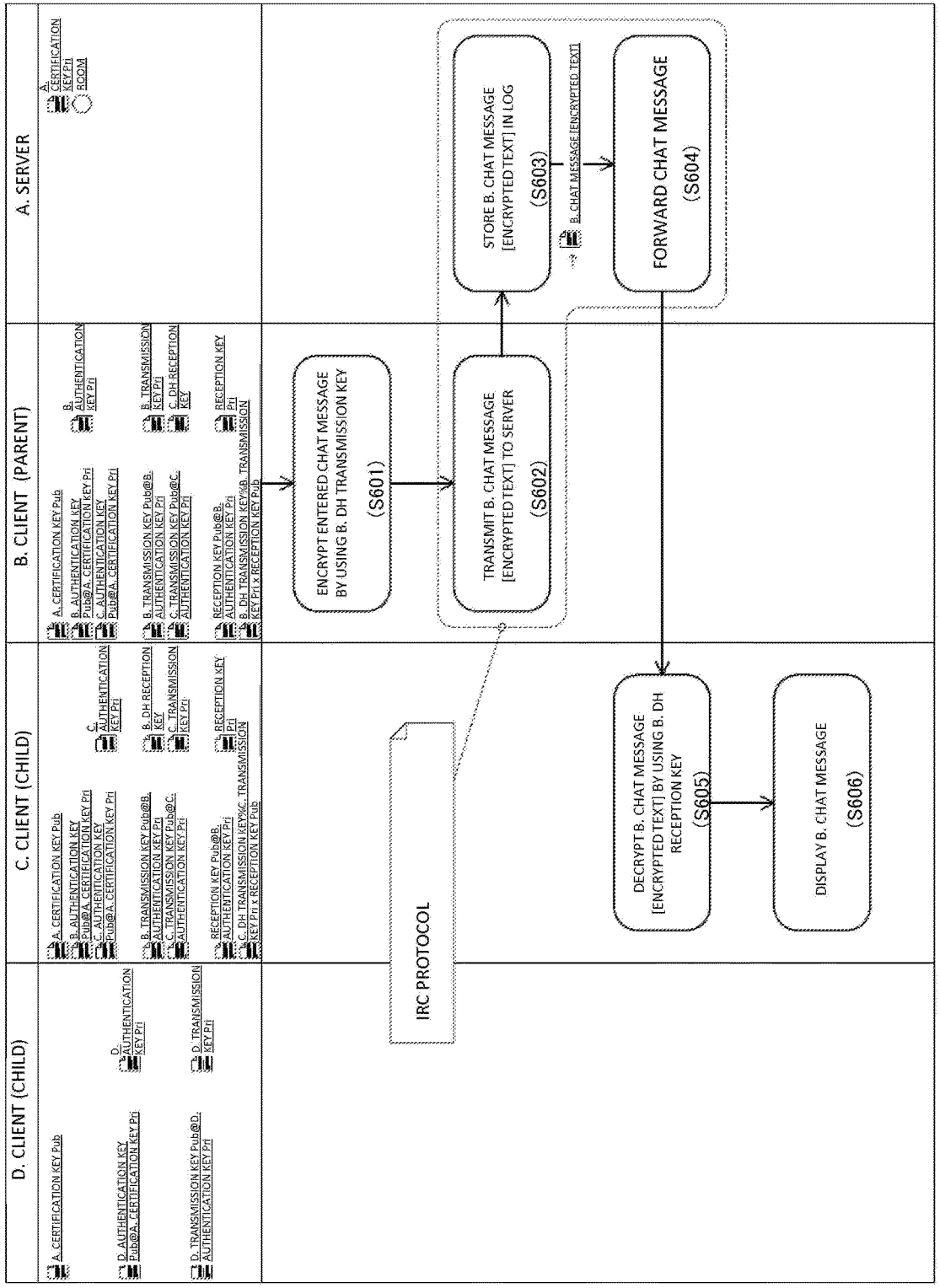
FIG. 13 illustrates an operation (a chat) according to the first exemplary embodiment of the present disclosure.

In this way, the B. client (parent) and the C. client (child) acquire a shared key used for encryption communications therebetween. FIG. 13 illustrates an operation (a chat) according to the first exemplary embodiment of the present disclosure. As illustrated in FIG. 13, the B. client (parent) encrypts a chat message entered by the corresponding user by using the DH shared key for transmission (the DH transmission key) created in step S203 (step S601) and transmits the encrypted chat message to the server (IRC server) (step S602).

The server (the IRC server) stores the encrypted chat message in a log (step S603) and transmits the encrypted chat message to the C. client in the same room (step S604). As illustrated in FIG. 13, these steps S602 to S604 are performed based on the IRC protocol.

After receiving the encrypted chat message, the C. client decrypts the encrypted chat message by using the DH shared key for reception (the DH reception key) created in step S502 (step S605). The C. client (child) displays the decrypted chat message (step S606). Hereinafter, likewise, when the C. client (child) transmits a chat message to the B. client (parent), the C. client (child) encrypts the chat message by using the DH shared key created in step S306, and the B. client (parent) decrypts the chat message by using the DH shared key created in step S404.

Figure 14:
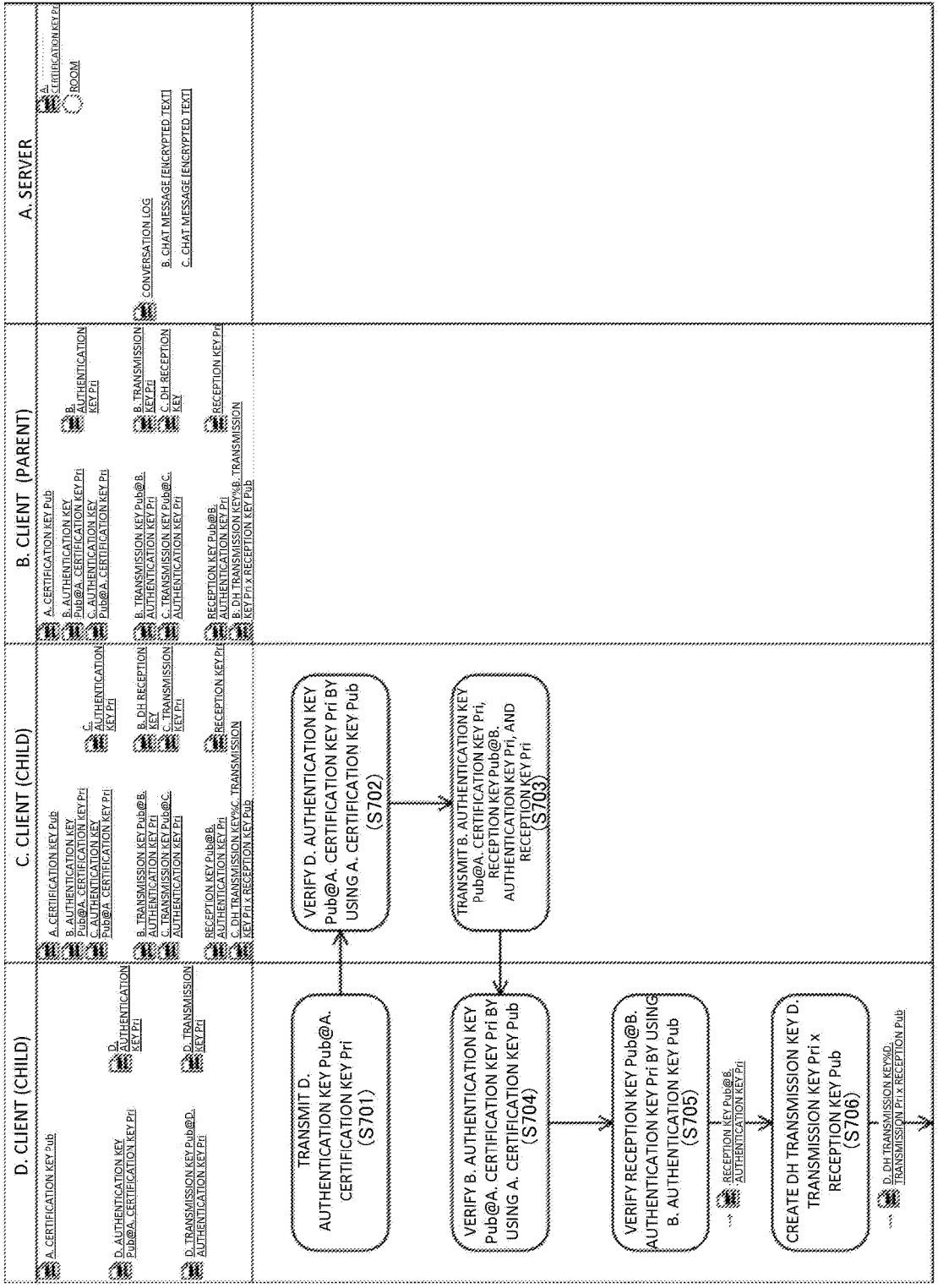
FIG. 14 illustrates an operation (participation in an ongoing conversation-1) according to the first exemplary embodiment of the present disclosure.

Next, an operation in which the D. client enters that the room the B. client (parent) and the C. client (child) are visiting will be described. FIG. 14 illustrates an operation (participation of the D. client in an ongoing conversation-1) according to the first exemplary embodiment of the present disclosure. As illustrated in FIG. 14, the D. client (child) transmits the D. authentication key Pub to which the signature of the certificate authority has been added to the C. client (child) (step S701). The C. client (child) verifies the D. authentication key Pub by using the certification key Pub of the certificate authority (step S702). In the example in FIG. 14, while the D. client (child) transmits the D. authentication key Pub to the C. client (child), the D. client (child) may be verified by transmitting the D. authentication key Pub to the B. client (parent). Namely, a participating user having the A. certification key Pub and the reception key can distribute the reception key to a new user(s).

If the C. client (child) successfully verifies the D. authentication key Pub, the C. client (child) transmits the B. authentication key Pub to which the signature of the certificate authority has been added, the reception key Pub to which the signature of the B. client has been added, and the reception key Pri to the D. client (child) (step S703). The D. client (child) verifies the B. authentication key Pub by using the certification key Pub of the certificate authority (step S704).

If the D. client (child) successfully verifies the B. authentication key Pub, the D. client (child) verifies the reception key Pub to which the signature of the B. client (parent) has been added by using the authentication key Pub of the B. client (parent) (step S705). If the D. client (child) successfully verifies the reception key Pub, the D. client (child) creates a DH shared key (a shared key for transmission) by using the D. transmission key Pri and the reception key Pub (step S706). The D. client (child) uses this DH shared key when encrypting its own message(s).

Figure 15:
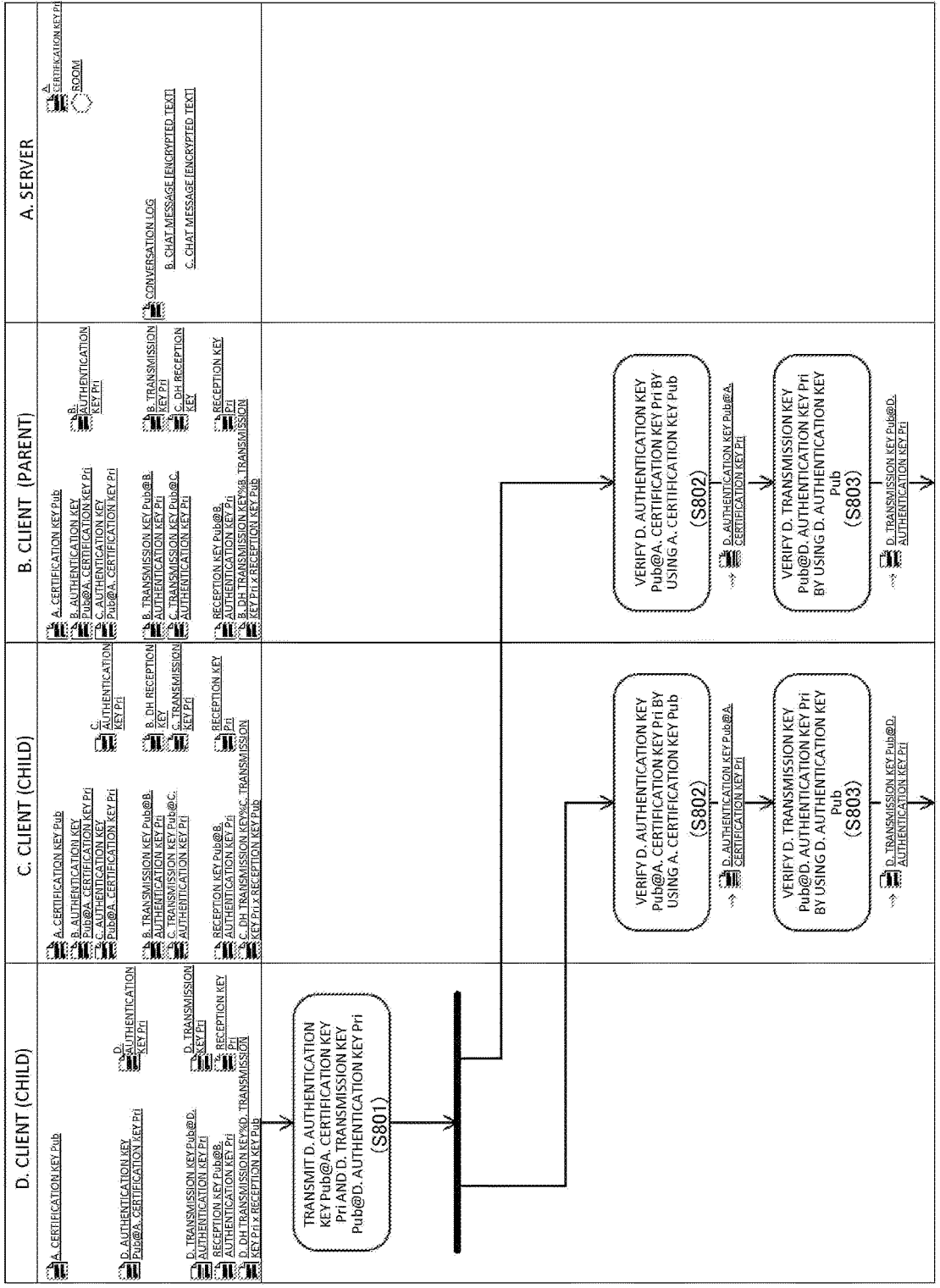
FIG. 15 illustrates an operation (participation in an ongoing conversation-2) according to the first exemplary embodiment of the present disclosure.

FIG. 15 is a diagram that follows FIG. 14. As illustrated in FIG. 15, after creating the DH shared key (the shared key for transmission), the D. client (child) transmits the D. authentication key Pub to which the signature of the certificate authority has been added and the D. transmission key Pub to which a signature created by using the D. authentication key Pri has been added to the B. client (parent) and the C. client (child) (step S801). The individual one of the B. client (parent) and the C. client (child) verifies the D. authentication key Pub by using the certification key Pub of the certificate authority (step S802).

After successfully verifying the D. authentication key Pub, the individual one of the B. client (parent) and the C. client (child) verifies the D. transmission key Pub by using the D. authentication key Pub of the D. client (step S803).

Figure 16:
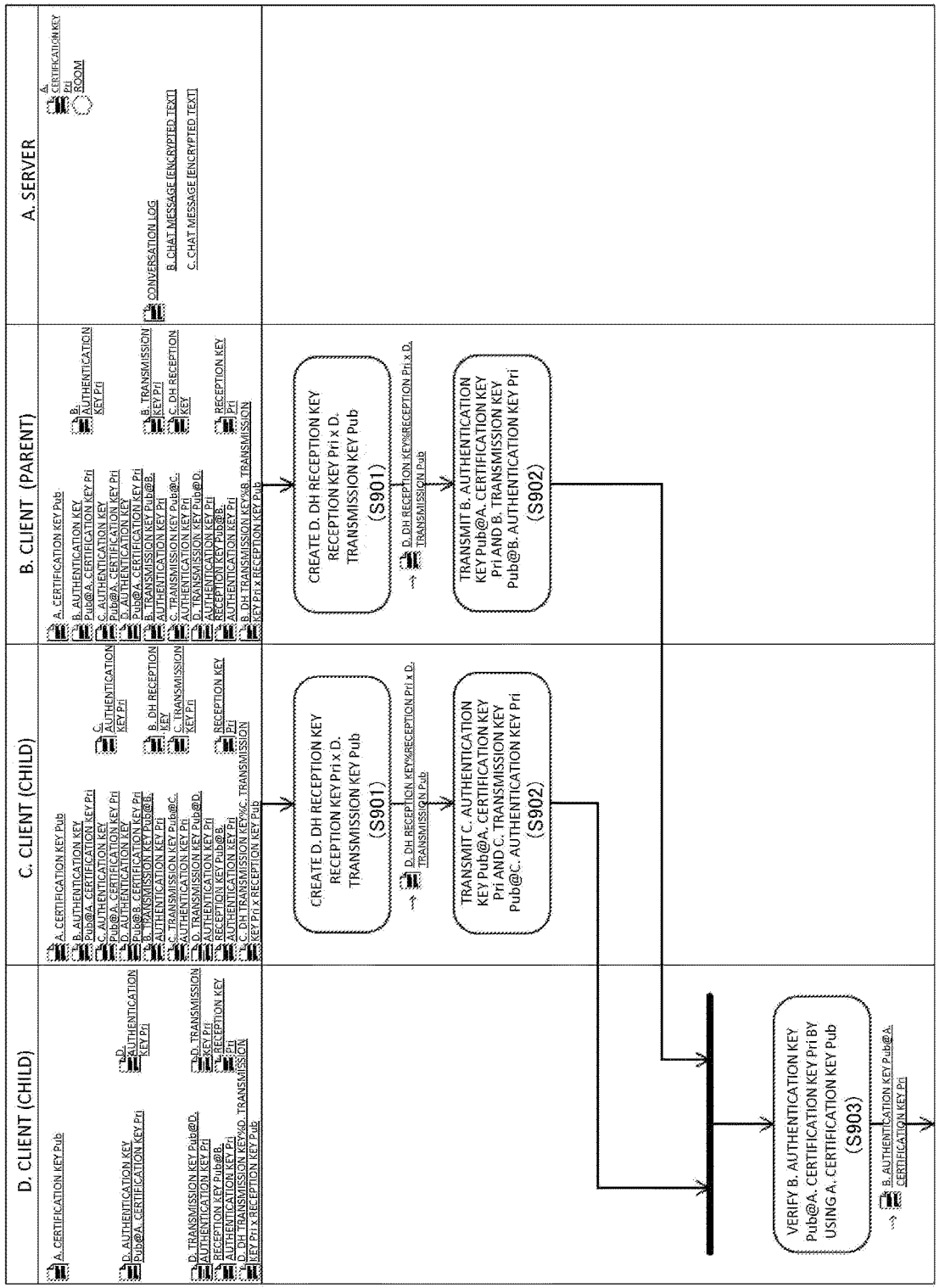
FIG. 16 illustrates an operation (participation in an ongoing conversation-3) according to the first exemplary embodiment of the present disclosure.

FIG. 16 is a diagram that follows FIG. 15. As illustrated in FIG. 16, after successfully verifying the D. transmission key Pub, the individual one of the B. client (parent) and the C. client (child) creates a DH shared key (a shared key for reception) by using the reception key Pri and the D. transmission key Pub (step S901). The B. client (parent) and the C. client (child) use this DH shared key when decrypting a message(s) from the D. client (child).

After creating the DH shared key (the shared key for reception), the B. client (parent) transmits the B. authentication key Pub to which the signature of the certificate authority has been added and the B. transmission key Pub to which a signature created by using the B. authentication key Pri has been added to the D. client (child) (step S902). Likewise, the C. client (child) transmits the C. authentication key Pub to which the signature of the certificate authority has been added and the C. transmission key Pub to which a signature created by using the C. authentication key Pri has been added to the D. client (child) (step S902).

The D. client (child) verifies the authentication key Pub received from the B. client (parent) by using the certification key Pub of the certificate authority (step S903).

Figure 17:
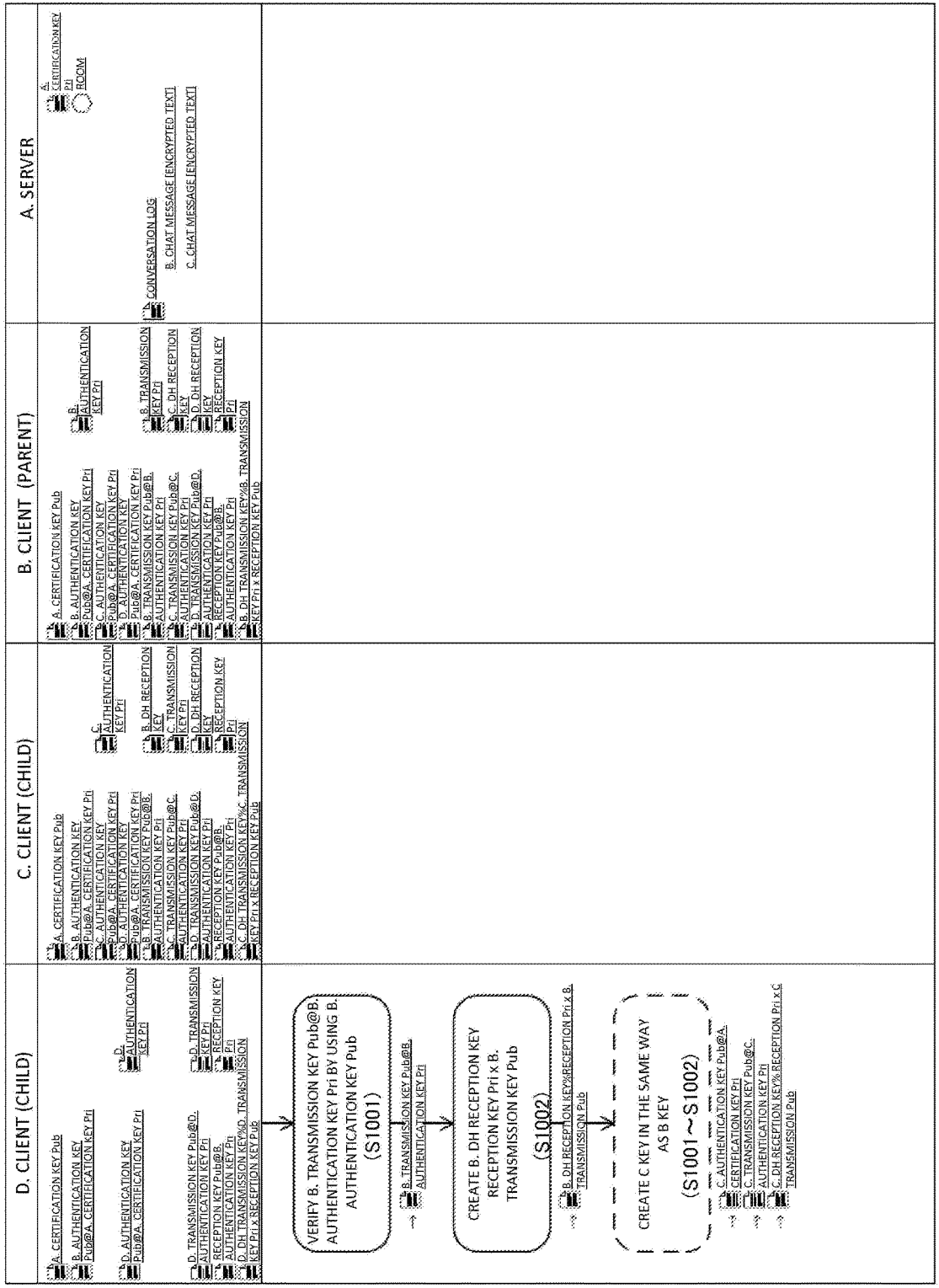
FIG. 17 illustrates an operation (participation in an ongoing conversation-4) according to the first exemplary embodiment of the present disclosure.

FIG. 17 is a diagram that follows FIG. 16. As illustrated in FIG. 17, if the D. client (child) successfully verifies the B. authentication key Pub, the D. client (child) verifies the B. transmission key Pub by using the B. authentication key Pub of the B. client (step S1001). If the D. client (child) successfully verifies the B. transmission key Pub, the D. client (child) creates a DH shared key (a shared key for reception) by using the reception key Pri and the B. transmission key Pub (step S1002). The D. client (child) uses this DH shared key when decrypting a message(s) from the B. client (parent). The D. client (child) also verifies the C. authentication key Pub and the C. transmission key Pub received from the C. client (child) in step S902. If the D. client (child) successfully verifies these keys, the D. client (child) creates a DH shared key (a shared key for reception) by using the reception key Pri and the C. transmission key Pub (steps S1001 and S1002).

Figure 18:
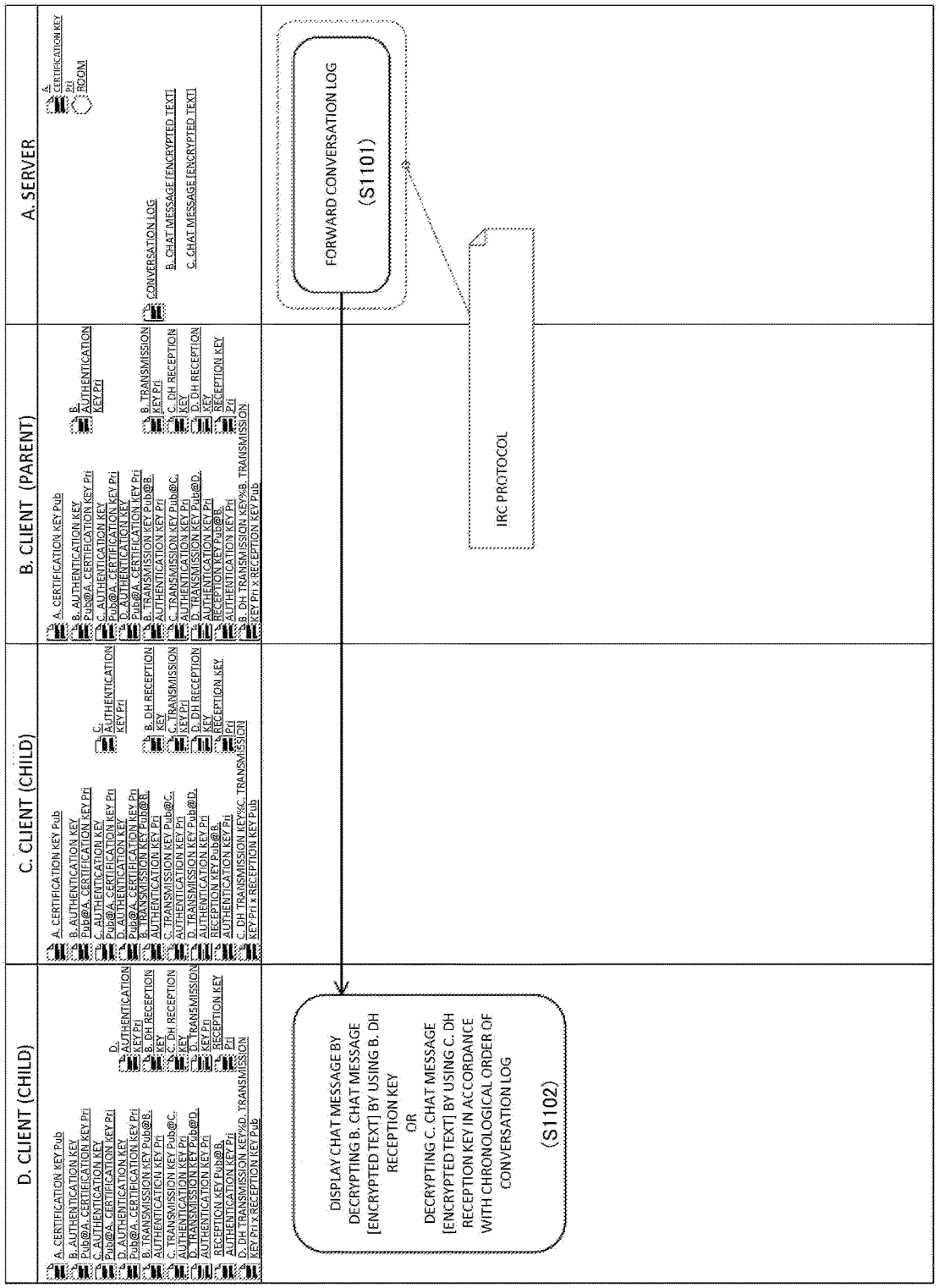
FIG. 18 illustrates an operation (browsing of a past log) according to the first exemplary embodiment of the present disclosure.

Consequently, the B. client (parent), the C. client (child), and the D. client (child) acquire a shared key used for encryption communications therebetween. FIG. 18 illustrates an operation performed when the D. client (child) browses a chat message(s) that has been exchanged between the B. client (parent) and the C. client (child). The present example assumes that the server (the IRC server) transmits a conversation log to the D. client (child), for example, in response to a request based on the IRC protocol (step S1101). The D. client (child) decrypts and displays a chat message(s) transmitted from the B. client (parent) or the C. client (child) in accordance with the chronological order of the conversation log (step S1102). At this point, the D. client (child) can decrypt the chat message(s) by using the DH shared key (the shared key for reception) created in step S1002.

Figure 19:
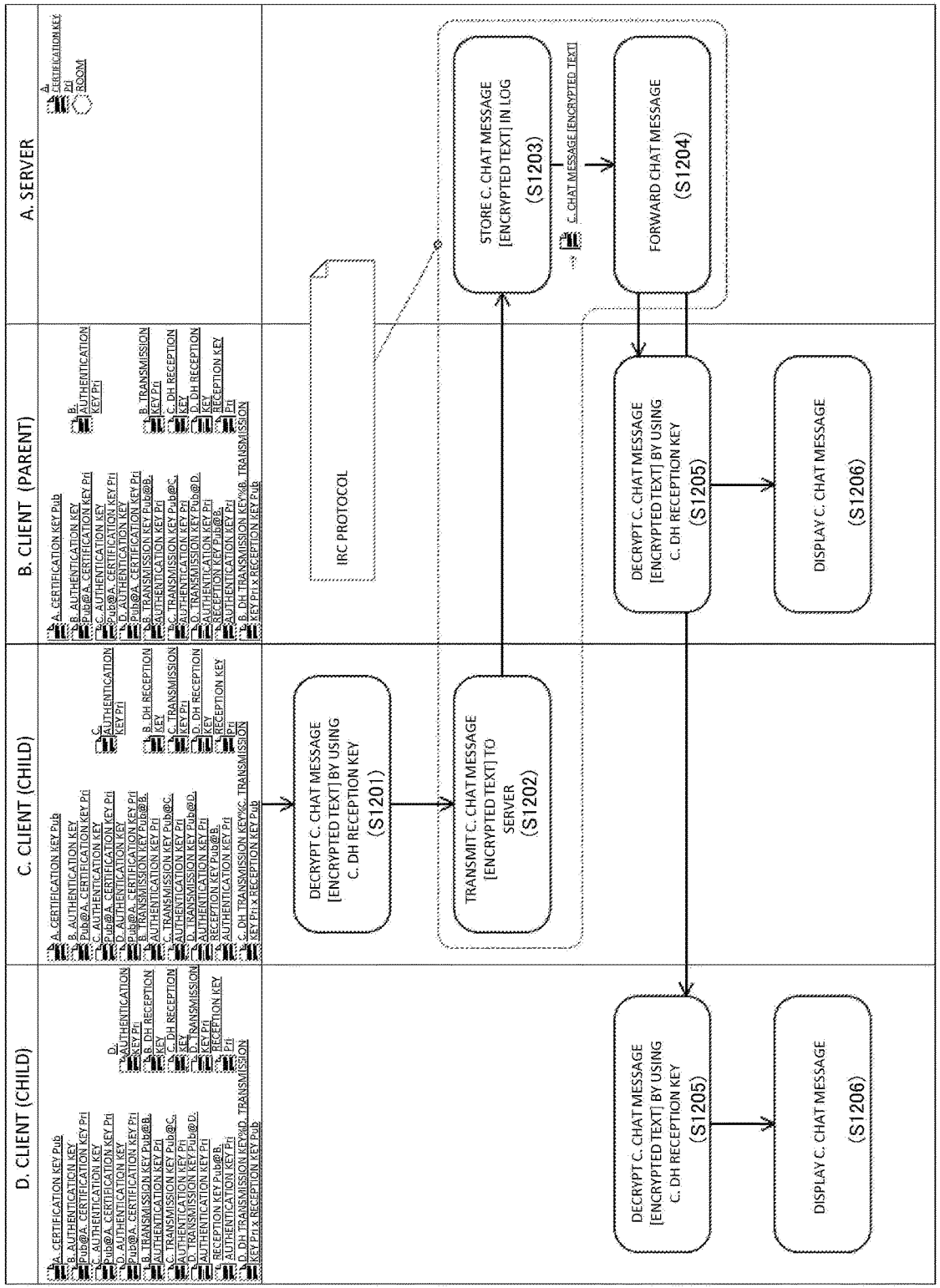
FIG. 19 illustrates an operation (a chat) according to the first exemplary embodiment of the present disclosure.

A real-time chat is possible on the same principle. FIG. 19 illustrates an operation (a chat) according to the first exemplary embodiment of the present disclosure. As illustrated in FIG. 19, the C. client (child) encrypts a chat message entered by the corresponding user by using the DH shared key for transmission (the DH transmission key) created in step S306 (step S1201) and transmits the encrypted chat message to the server (the IRC server) (step S1202).

The server (the IRC server) stores the encrypted chat message in a log (step S1203) and transmits the encrypted chat message to the B. client (parent) and the D. client (child) visiting the same room (step S1204). As illustrated in FIG. 19, these steps S1202 to S1204 are performed based on the IRC protocol.

After receiving the encrypted chat message, the B. client (parent) decrypts and displays the encrypted chat message by using the DH shared key for reception (the DH reception key) created in step S404 (steps S1205 and S1206). Likewise, the D. client (child) decrypts and displays the encrypted chat message by using the DH shared key for reception (the DH reception key) created in step S1002 (steps S1205 and S1206).

As described above, according to the present exemplary embodiment, when a one-to-many encryption communication is performed by using public key encryption, since a one-to-one communication, which is performed in the cases illustrated in FIGS. 25 to 28, does not need to be performed in a round-robin fashion, the convenience is improved. In addition, according to the present exemplary embodiment, since a communication between a set of clients can be performed by using a single shared key (two shared keys when different keys are used for transmission and reception), the number of keys to be managed can be reduced. In addition, according to the present exemplary embodiment, as the above D. client (child) can participate in an ongoing conversation, a user participating in an ongoing conversation can access log data.

In addition, since the present exemplary embodiment can reduce the frequency of requesting the certificate authority to add a signature, in this respect, too, the convenience is improved. This is because, since an individual client serves as an intermediate certificate authority and adds a signature to a key generated by himself/herself by using a key (authentication key) to which a signature from a certificate authority has been added, the identify can be certified.

Second Exemplary Embodiment

Next, a second exemplary embodiment in which the present disclosure is applied to exchange of information via a storage medium, not a real-time communication, will be described. Since the basic operation principle according to the second exemplary embodiment is the same as that according to the first exemplary embodiment, the following description will be made with a focus on differences.

Figure 20:
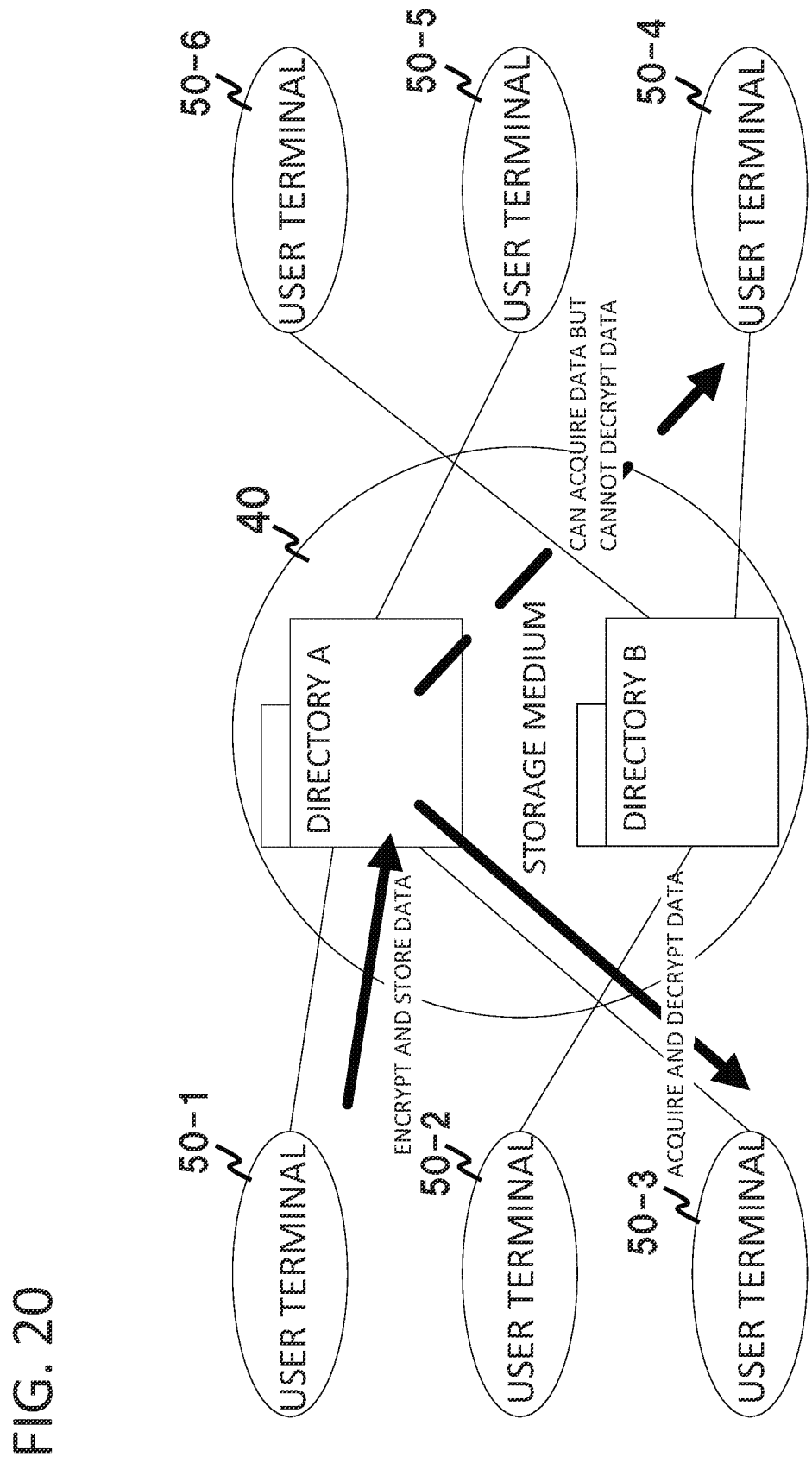
FIG. 20 illustrates a configuration of an encryption communication system according to a second exemplary embodiment of the present disclosure.

FIG. 20 illustrates a configuration of an encryption communication system according to a second exemplary embodiment of the present disclosure. The second exemplary embodiment differs from the first exemplary embodiment illustrated in FIG. 4 in that a storage medium 40 is used in place of the IRC server and a directory serves as a place where data is exchanged among user terminals 50-1 to 50-6, as in an IRC room. Preferable examples of the storage medium include an easily read or written memory device such as a Universal Serial Bus (USB) memory, an SD card, a solid state drive (SSD), and any of various kinds of disk drive. As in the above first exemplary embodiment, a certain user terminal (for example, the user terminal 50-1) creates a DH shared key, encrypts data, and stores the data in a desired location in the storage medium 40. Next, among the other user terminals, a user terminal (for example, the user terminal 50-3) that has exchanged the corresponding DH shared key with the user terminal 50-1 can decrypt the data read from the storage medium 40. In contrast, a user terminal (for example, the user terminal 50-4) that has not exchanged the corresponding DH shared key with the user terminal 50-1 cannot decrypt the data read from the storage medium 40.

Figure 21:
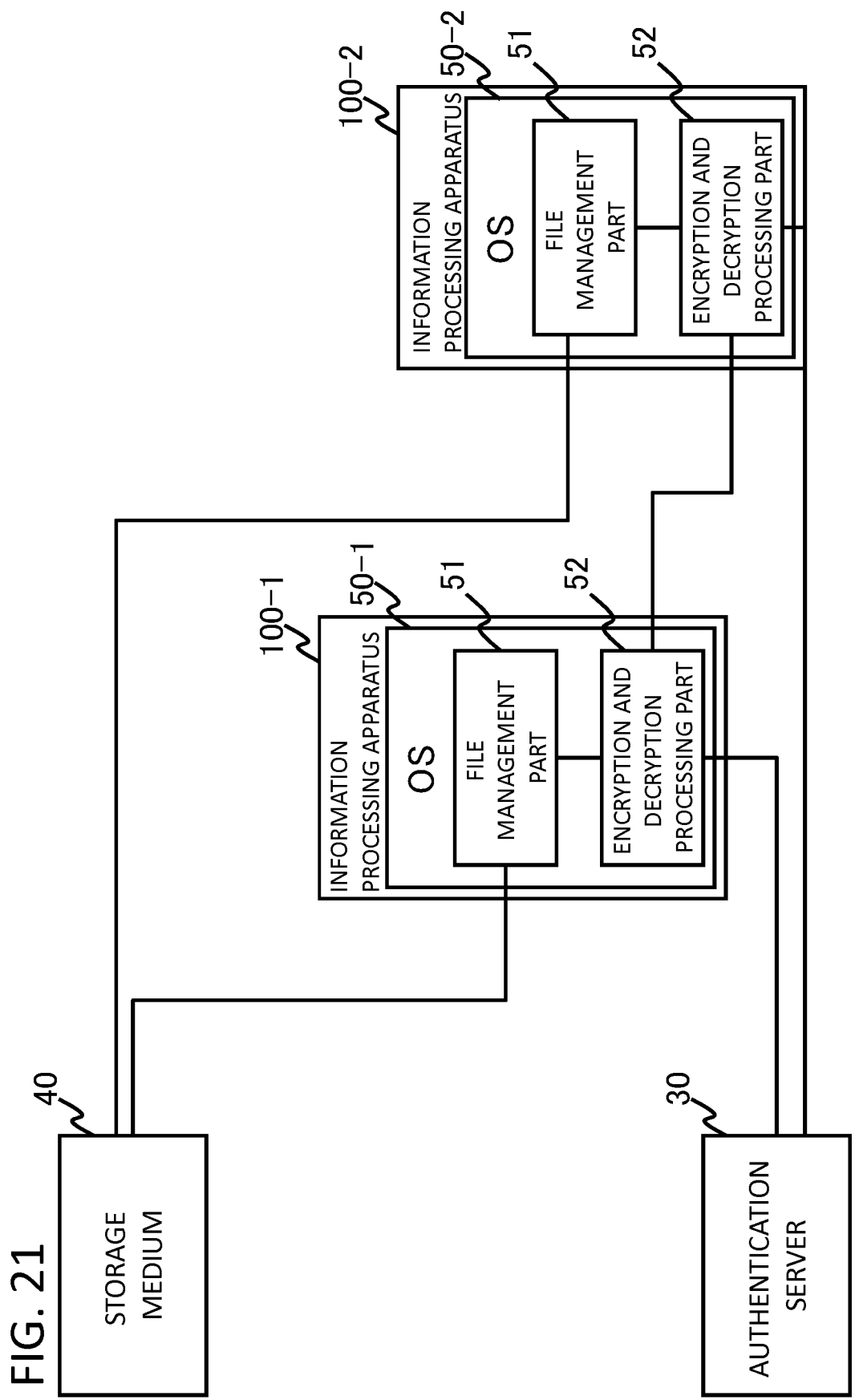
FIG. 21 illustrates a physical configuration of the encryption communication system according to the second exemplary embodiment of the present disclosure.

FIG. 21 illustrates a physical system according to the second exemplary embodiment. While the configuration in FIG. 21 is essentially the same as that illustrated in FIG. 5, the present configuration differs from the configuration illustrated in FIG. 5 in that the IRC server 20 is replaced by the storage medium 40 and that the IRC clients 10-1 and 10-2 in the information processing apparatuses 100-1 and 100-2 are replaced by operating systems (OSs) 50-1 and 50-2. Namely, each of the OSs 50-1 and 50-2 includes a file management part 51 and an encryption and decryption processing part 52 that encrypts and decrypts the data exchanged by the file management part 51. The basic data flow is the same as that according to the first exemplary embodiment and is as follows. When a user of an information processing apparatus stores data in the storage medium 40, the file management part 51 transmits the data to the encryption and decryption processing part 52. The encryption and decryption processing part 52 encrypts the data and returns the data to the file management part 51. The file management part 51 stores the encrypted data in the storage medium 40. When a different information processing apparatus reads the encrypted data stored in the storage medium 40, the OS of this information processing apparatus uses the corresponding encryption and decryption processing part 52 to decrypt the encrypted data and presents the decrypted data to the corresponding user.

Figure 22:
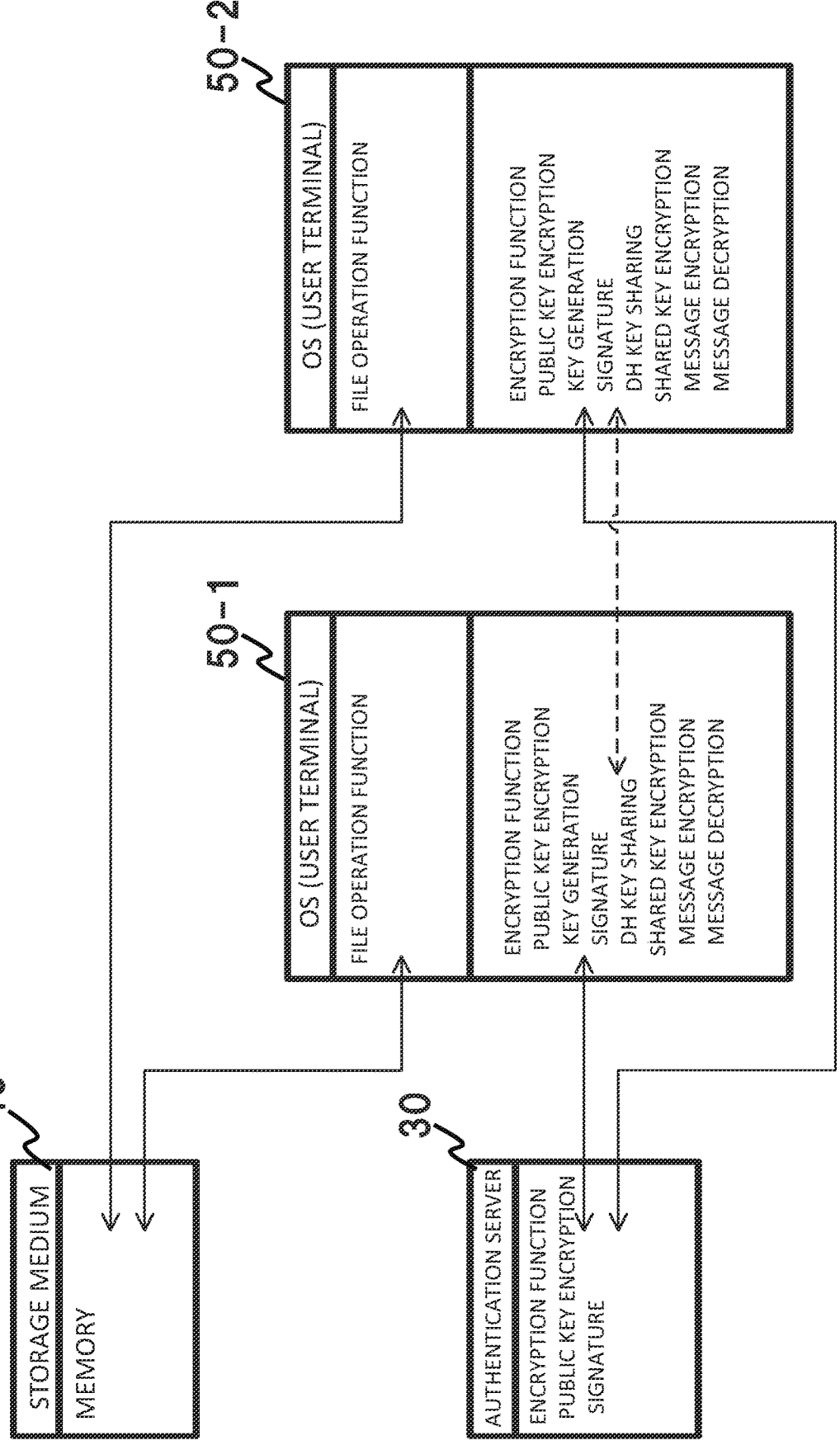
FIG. 22 illustrates a software configuration of the encryption communication system according to the second exemplary embodiment of the present disclosure.
Figure 23:
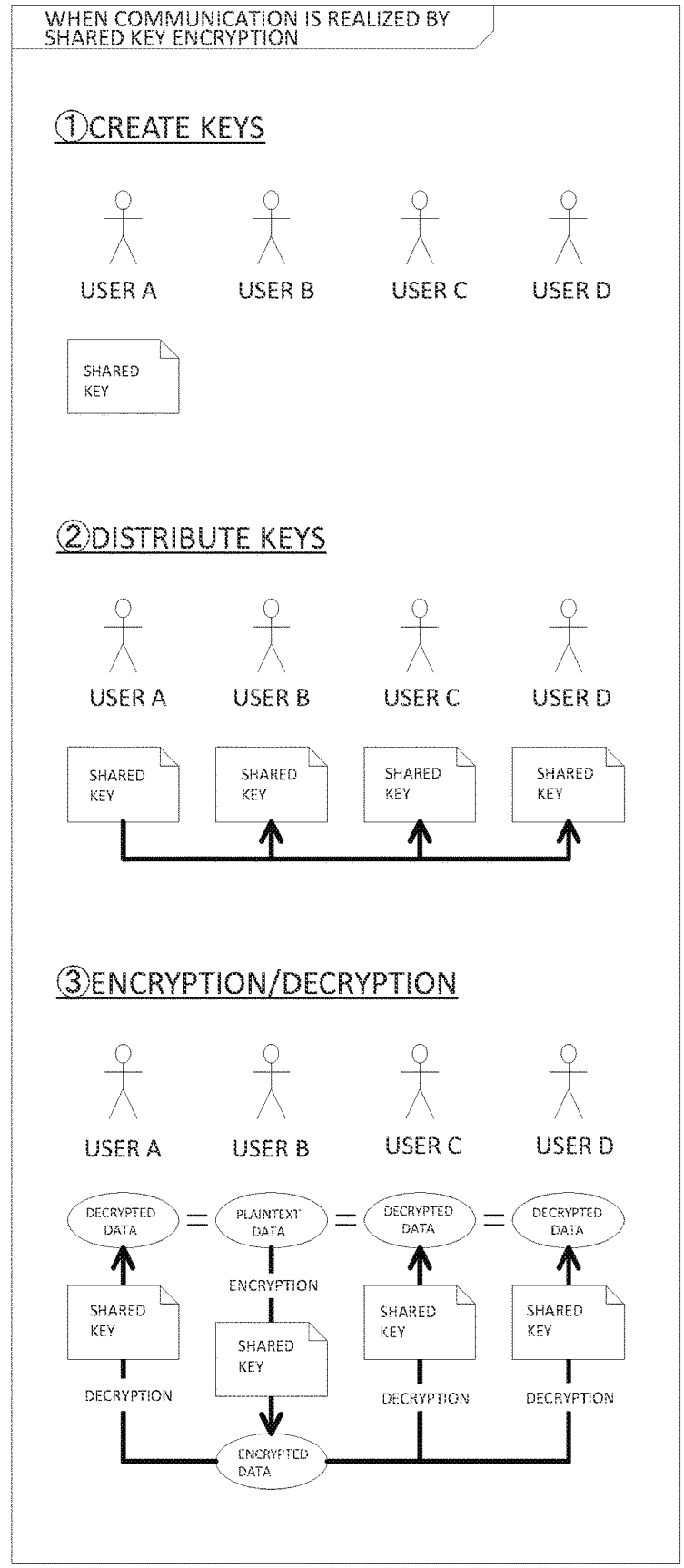
FIG. 23 illustrates a procedure performed when encryption communications are performed with a shared key.
Figure 24:
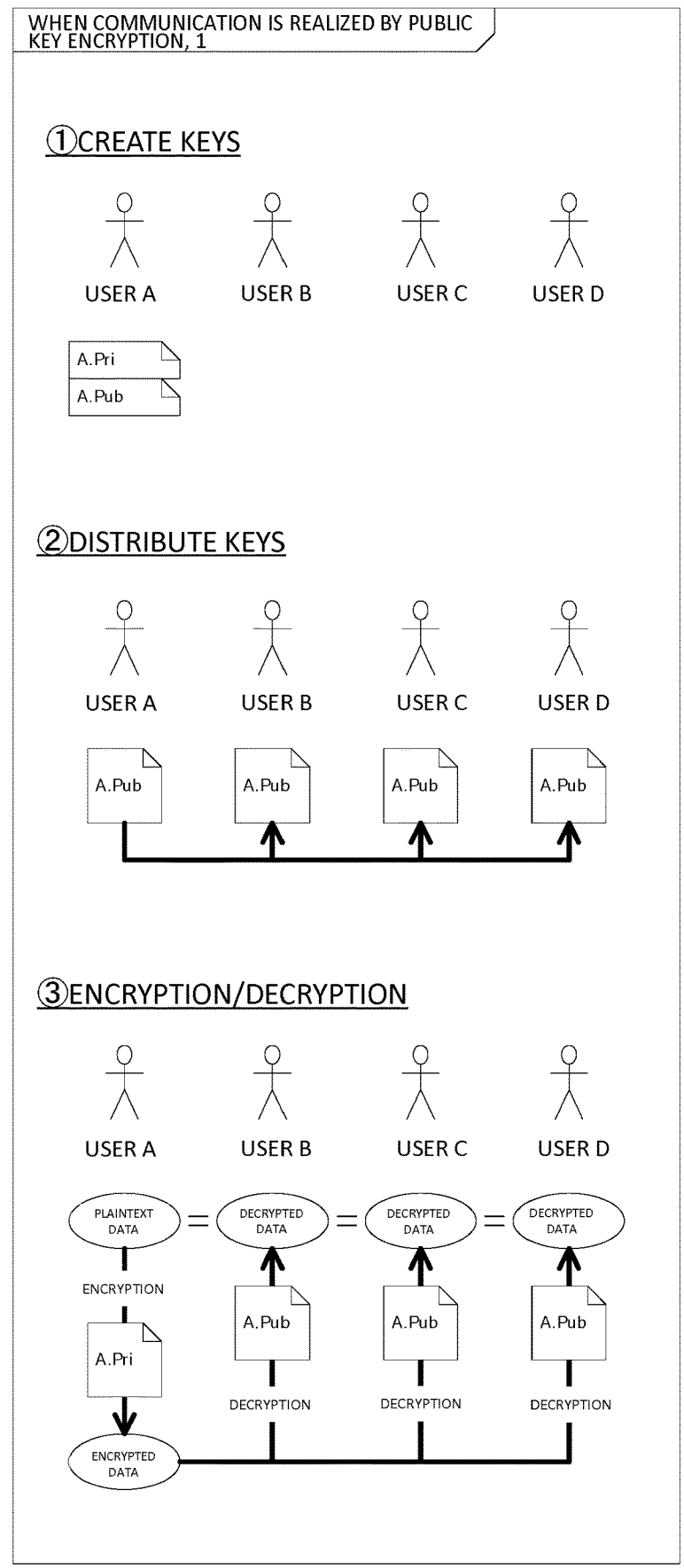
FIG. 24 illustrates a procedure performed when encryption communications are performed with a public key (encryption is performed with a private key of a transmitter).
Figure 25:
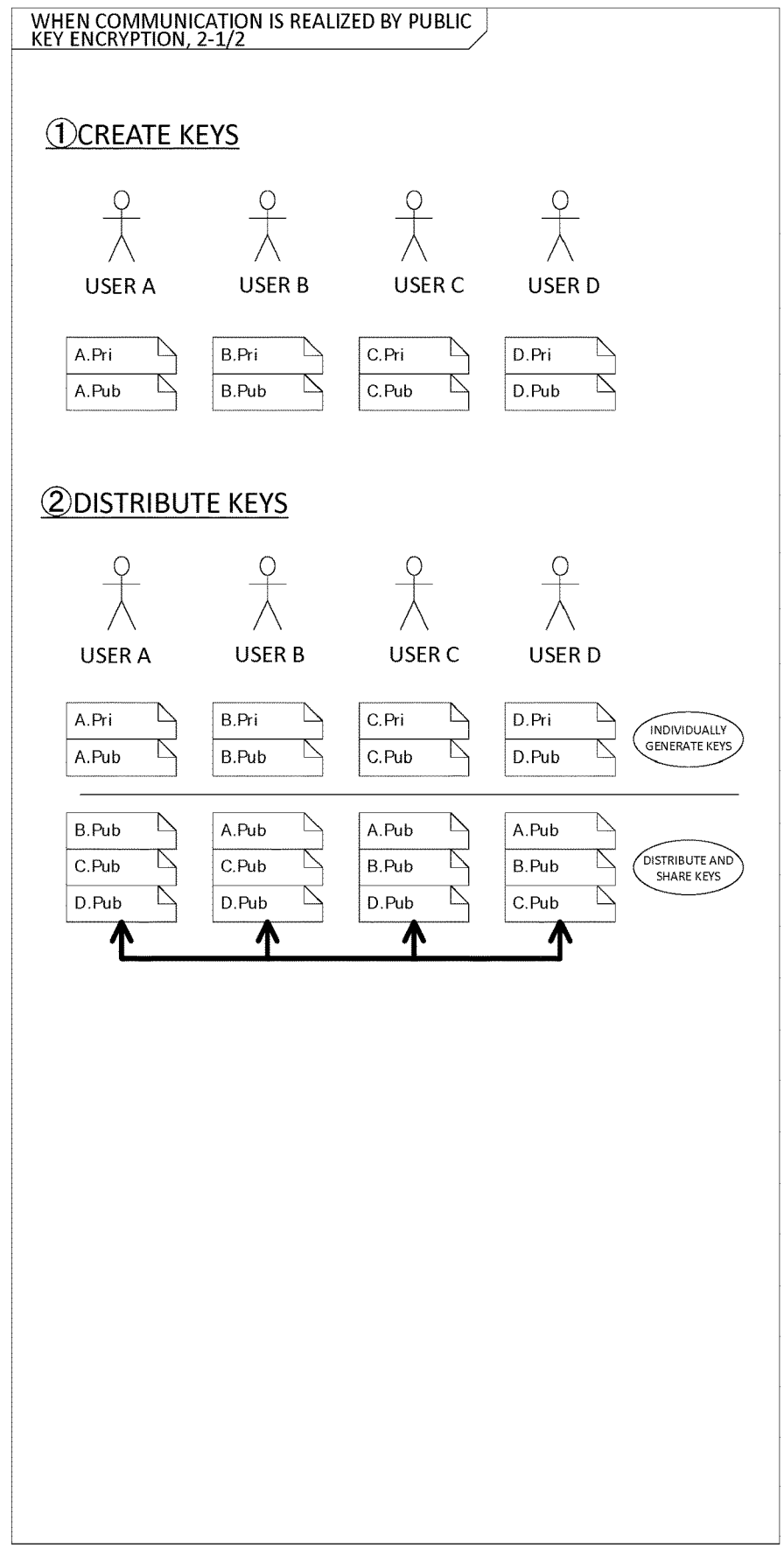
FIG. 25 illustrates a procedure performed when encryption communications are performed with a public key (encryption is performed with a public key of a receiver).
Figure 26:
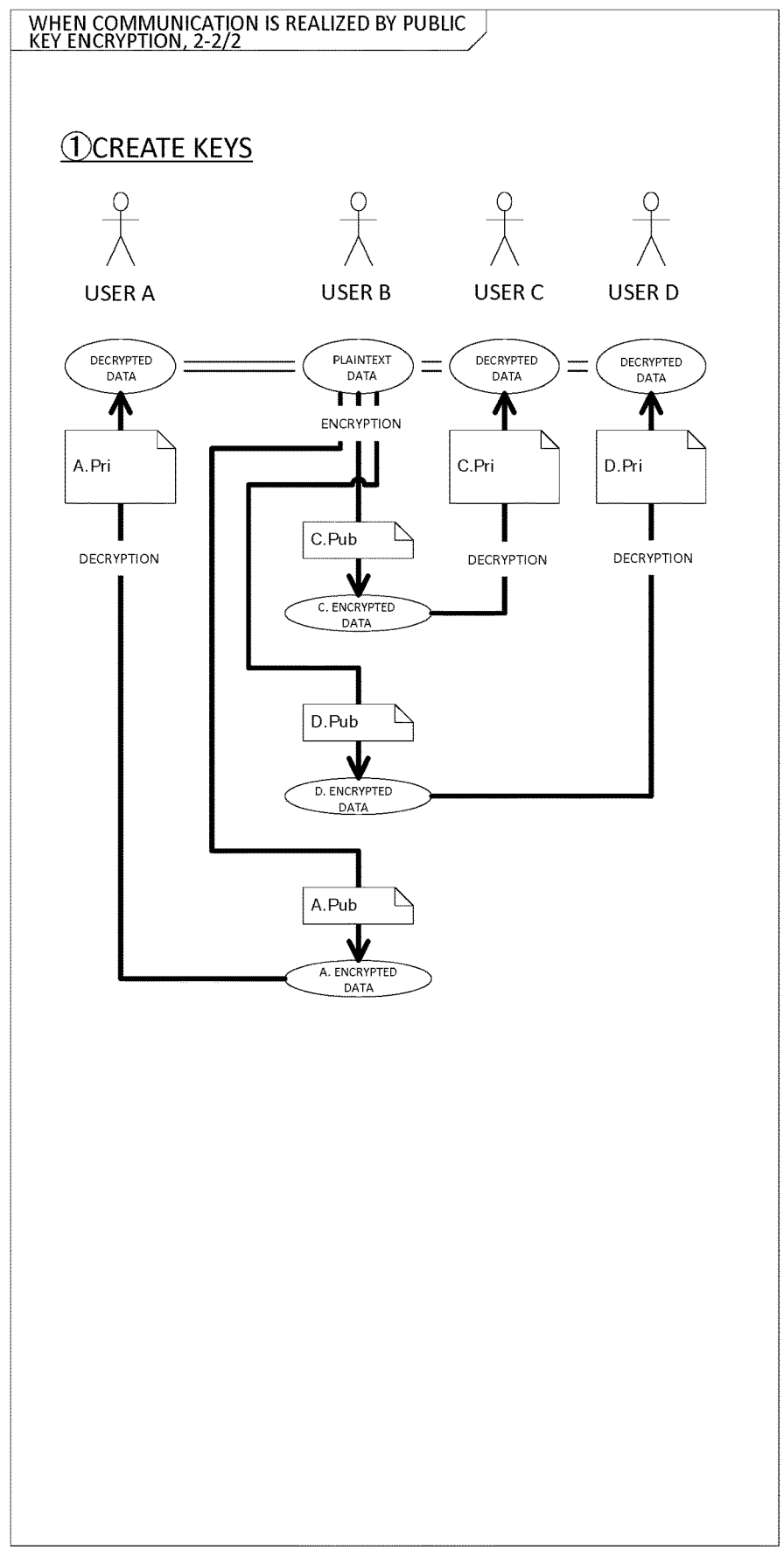
FIG. 26 illustrates a procedure performed when encryption communications are performed with a public key (encryption is performed with a public key of a receiver).
Figure 27:
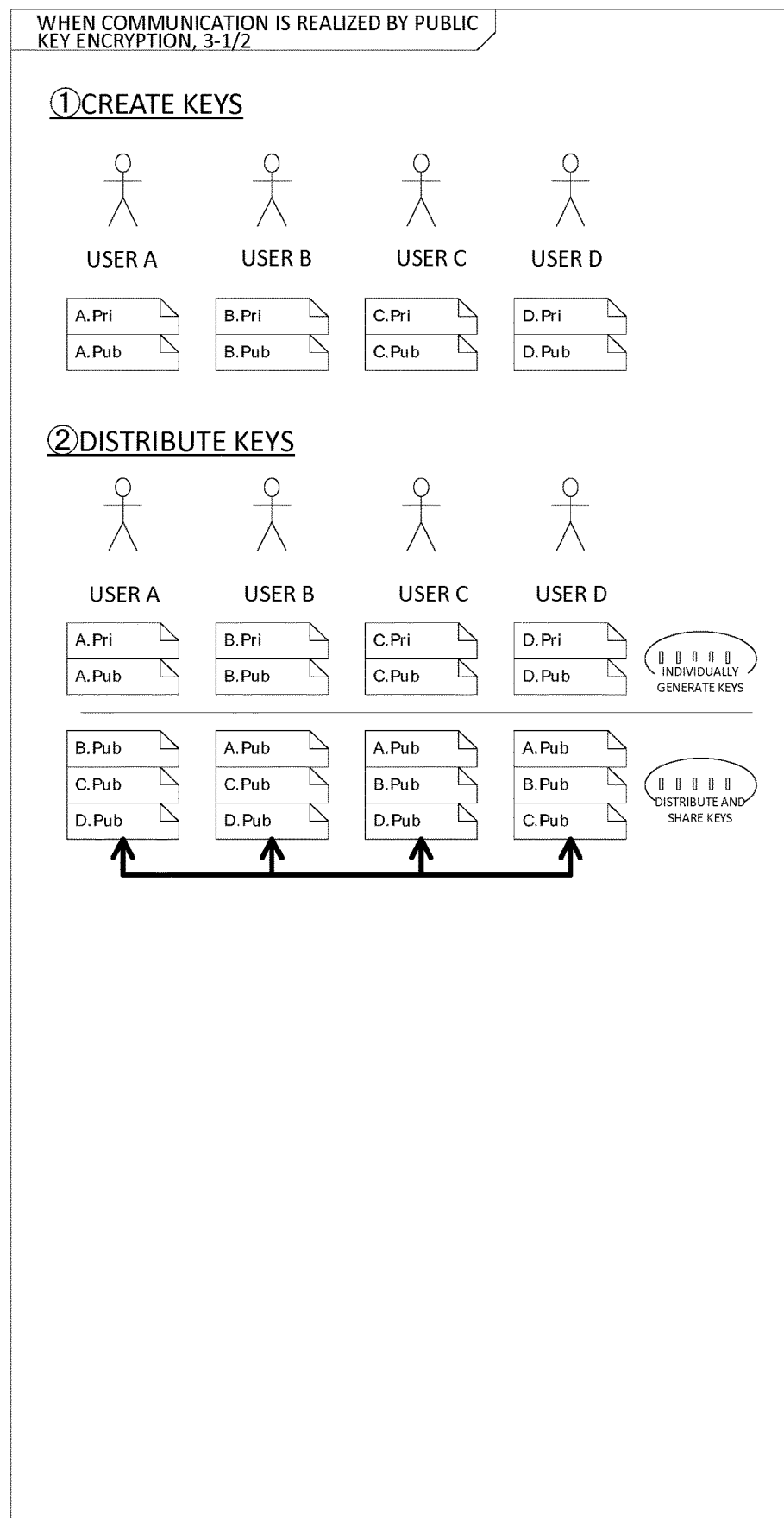
FIG. 27 illustrates a procedure performed when encryption communications are performed with a public key (DH key exchange is used).
Figure 28:
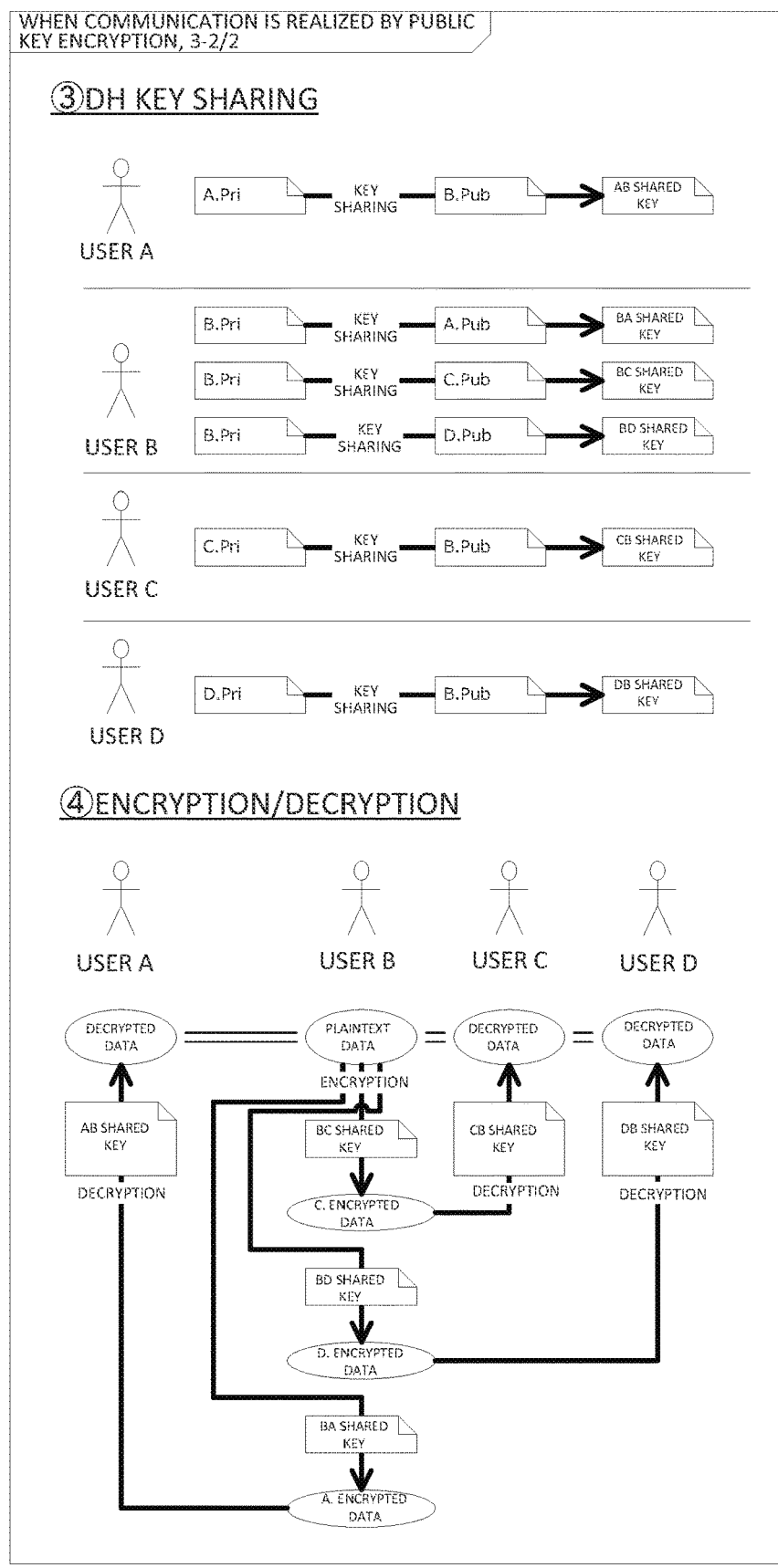
FIG. 28 illustrates a procedure performed when encryption communications are performed with a public key (DH key exchange is used).

FIG. 22 illustrates a software configuration of a chat system according to the present exemplary embodiment. The present configuration in FIG. 22 is also essentially the same as that according to the first exemplary embodiment illustrated in FIG. 6. The file operation functions (corresponding to the above file management parts 51) of the OSs (the user terminals) 50-1 and 50-2 are those included in a general OS. The encryption functions in the OSs 50-1 and 50-2 in FIG. 22 correspond to the above encryption and decryption processing parts 52, each of which exchanges an encryption key with the authentication server 30 and a different IRC client, finally creates a shared key, and performs data encryption/decryption. While only two information processing apparatuses are illustrated for ease of description in the example in FIG. 21, three or more information processing apparatuses may of course be used.

According to the second exemplary embodiment, it is preferable to adopt a mode in which a key(s) is managed separately from the storage medium 40 in which data is stored and exchange is performed between users by using a different storage medium.

Other operations are the same as the first exemplary embodiment. The individual users exchange keys. One user stores encrypted data in the storage medium 40, and a different user decrypts the encrypted data by using a shared key and uses the decrypted data. In this way, according to the present exemplary embodiment, data in a single storage medium can be shared by using an encryption key different depending on the community or user group. In addition, as in the first exemplary embodiment, even if a new user participates in a community or a user group, the user can decrypt data already encrypted in the storage medium 40 without encrypting the data again.

As is clear from the above second exemplary embodiment, regarding the encryption strength, if obsolescence of a selected public key encryption technique due to advancement in computer or discovery of vulnerability is ignored, the present disclosure can realize encryption/decryption processing on a very long time frame. This is because a mechanism that updates a key(s) in a short period for satisfying Perfect Forward Security requirements and guarantees the validity of the key(s) that frequently changes is realized by using a method that does not place load on the operation. Any public key encryption logic is applicable to the present disclosure, as long as the logic supports DH key sharing (including narrowly-defined DH key sharing using a discrete logarithm and an improved method such as elliptic curve DH key sharing (ECDH) using elliptic curve encryption).

While exemplary embodiments of the present disclosure have thus been described, the present disclosure is not limited thereto. Further variations, substitutions, or adjustments can be made without departing from the basic technical concept of the present disclosure. For example, the configurations of the networks, the configurations of the elements, and the representation modes of the messages illustrated in the drawings have been used only as examples to facilitate understanding of the present disclosure. Namely, the present disclosure is not limited to the configurations illustrated in the drawings.

An individual part (processing means) of each of the individual apparatuses illustrated in FIGS. 5 and 21 can be realized by a computer program that causes a processor mounted on the corresponding apparatus to use its hardware and perform the corresponding processing, as illustrated in FIG. 6 and FIG. 22.

Figure 29:
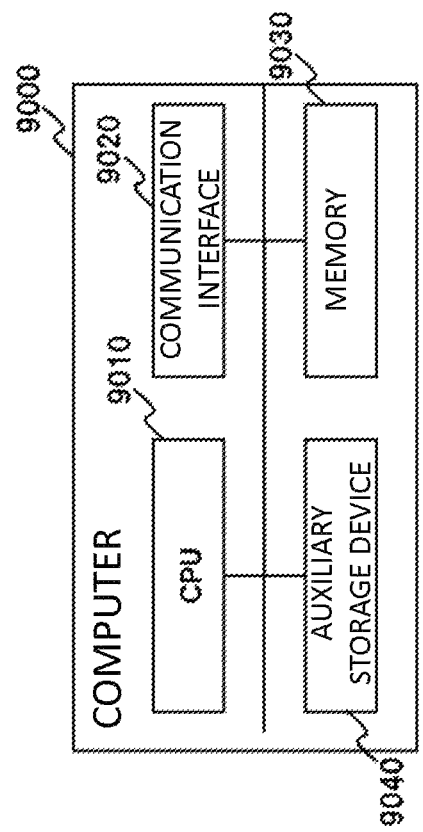
FIG. 29 illustrates a configuration of a computer that constitutes an information processing apparatus according to the present disclosure.

In addition, an individual one of the above exemplary embodiments can be realized by a program that causes a computer (9000 in FIG. 29) that serves as a user terminal to realize the corresponding functions as the terminal. For example, the computer includes a CPU (central processing unit) 9010, a communication interface 9020, a memory 9030, and an auxiliary storage device 9040 in FIG. 29. Namely, the CPU 9010 in FIG. 16 may perform a private key distribution program, a shared key creation program, and a communication execution program and perform processing for updating various calculation parameters stored in the auxiliary storage device 9040, etc.

Finally, suitable modes of the present disclosure will be summarized.

[Mode 1]

(See the encryption communication method according to the above first aspect)

[Mode 2]

The encryption communication method may include steps of:

causing the different terminal(s) to create a second shared key by using the corresponding first private key prepared in the (A) and the second public key shared in the (B); and causing the one terminal to create a second shared key by using the second private key shared in the (B) and the first public key of the one terminal prepared in the (A);

wherein an individual one of the two or more terminals may use one of the corresponding shared key and second shared key for transmission and the other for reception.

[Mode 3]

The encryption communication method may include steps of:

(E) causing a third terminal to prepare a first public key and a first private key;

(F) causing one of the two or more terminals to distribute the second public key and the second private key shared in the (B) to the third terminal;

(G) causing the third terminal to create a shared key used to communicate with an individual one of the two or more terminals by using the corresponding first private key prepared in the (E) and the second public key shared in the (F); and (H) causing an individual one of the two or more terminals to create a shared key used to communicate with the third terminal by using the second private key shared in the (F) and the first public key shared in the (E).

[Mode 4]

In the encryption communication method, it is preferable that the shared keys be created by using DH key exchange.

[Mode 5]

In the encryption communication method, an individual one of the two or more terminals may hold a set of a public key for authentication and a private key for authentication to which a signature of a predetermined certificate authority has been added and add a signature to information transmitted to a different terminal(s) by using the corresponding public key for authentication.

[Mode 6]

An information processing apparatus, including:

(A) means for preparing a set of a first public key and a first private key;

(B1) means for creating a set of a second public key and a second private key and distributing the set to a different terminal(s);

(C1) means for creating a shared key by using the first private key prepared in the (A) and the second public key shared in the (B 1); and (D1) means for performing an encryption communication(s) with a different terminal(s) that creates a shared key by using the second private key shared in the (B1) and the prepared first public key by using the shared key created in the (C1).

[Mode 7]

An information processing apparatus, including:

(A) means for preparing a set of a first public key and a first private key;

(B2) means for receiving a set of a second public key and a second private key from a different terminal;

(C2) means for creating a shared key by using the second private key shared in (B2) and the first public key prepared in the (A); and (D2) means for performing an encryption communication(s) with a different terminal(s) that creates a shared key by using the prepared first public key and the second private key shared in the (B2) by using the shared key created in the (C2).

[Mode 8]

Information processing apparatuses may perform the encryption communication(s) by causing one information processing apparatus to store encrypted data in a predetermined storage medium and causing a different information processing apparatus(es) to read the encrypted data from the predetermined storage medium and decrypt the encrypted data.

[Mode 9]

A certificate authority apparatus, connected to:

a first information processing apparatus including:

(A) means for preparing a set of a first public key and a first private key;

(B1) means for creating a set of a second public key and a second private key and distributing the set to a different terminal(s);

(C1) means for creating a shared key by using the first private key prepared in the (A) and the second public key shared in the (B1); and (D1) means for performing an encryption communication(s) with a different terminal(s) that creates a shared key by using the second private key shared in the (B1) and the prepared first public key by using the shared key created in the (C1); and a second information processing apparatus including:

(A) means for preparing a set of a first public key and a first private key;

(B2) means for receiving a set of a second public key and a second private key from a different terminal;

(C2) means for creating a shared key by using the second private key shared in the (B2) and the first public key prepared in the (A); and (D2) means for performing an encryption communication(s) with a different terminal(s) that creates a shared key by using the prepared first private key and the second public key shared in the (B2) by using the shared key created in the (C2), and certifying a signature that the first and second information processing apparatuses use to prove their identities.

[Mode 10]

A program, causing an information processing apparatus to perform processing for:

(A) preparing a set of a first public key and a first private key;

(B1) creating a set of a second public key and a second private key and distributing the set to a different terminal(s);

(C1) creating a shared key by using the first private key prepared in the (A) and the second public key shared in the (B1); and (D1) performing an encryption communication(s) with a different terminal(s) that creates a shared key by using the second private key shared in the (B1) and the prepared first public key by using the shared key created in the (C1).

[Mode 11]

A program, causing an information processing apparatus to perform processing for:

(A) preparing a set of a first public key and a first private key;

(B2) receiving a set of a second public key and a second private key from a different terminal;

(C2) creating a shared key by using the second private key shared in the (B2) and the first public key prepared in the (A); and (D2) performing an encryption communication(s) with a different terminal(s) that creates a shared key by using the prepared first private key and the second public key shared in the (B2) by using the shared key created in the (C2).

The above modes 6 to 11 can be expanded in the same way as mode 1 is expanded into modes 2 to 5.

The disclosure of each of the above PTLs is incorporated herein by reference thereto. Variations and adjustments of the exemplary embodiments and examples are possible within the scope of the overall disclosure (including the claims) of the present disclosure and based on the basic technical concept of the present disclosure. Various combinations and selections (including partial eliminations) of various disclosed elements (including the elements in the claims, exemplary embodiments, examples, drawings, etc.) are possible within the scope of the disclosure of the present disclosure. Namely, the present disclosure of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

INDUSTRIAL APPLICABILITY

The present disclosure is suitably applicable to, but not limited to, the following fields and application products.

Data protection/data sharing of (offline) portable storage media
    USB, SD, SSD memory products, etc.
(Online) cloud data protection/data sharing
    Web contents
    Data servers
    IoT (Internet of Things)
    Big Data
    Establishment of SNSs (Social Networking Services)
    Teleworking systems, etc.
Mutual authentication beyond the time frame
    (Application of [present] - - - [past]) such as information about the family history or records about successive relatives
    (One can realize a mutual authentication with a person(s) who has already passed away and with whom he or she cannot perform a mutual authentication in reality)
    (Application of [present] - - - [future]) space development
    (One can realize a mutual authentication with a person(s) who exists in several dozen light years away while he or she is not alive then)
Protection of real-time communications
    Text chat communication services
    PP2P-type SNS communication services
    server/client-type communication services
    voice chat communication services
    P2P-typ audio communication services
    electronic conference communication services

REFERENCE SIGNS LIST 10, 10-1 to 10-6 IRC client
11 IRC processing part
12, 52 encryption and decryption processing part
20, 20-A to 20-D IRC server
30 authentication server
40 storage medium
50-1 to 50-6 OS
51 file management part
100-1, 100-2 information processing apparatus (terminal)

What is claimed is:

1. An encryption communication method, comprising:

causing a first terminal from among a plurality of terminals to prepare a first public key and a first private key;

causing a second terminal from among the plurality of terminals to create a second public key and a second private key and to distribute the second public key and the second private key to the other terminal(s) among the plurality of terminals using a predetermined key delivery method;

causing the first terminal to create a first shared transmission key based on the first private key and the second public key;

causing a terminal from among the plurality of terminals other than the first terminal to create a first shared reception key used to communicate with the first terminal based on the second private key and the first public key;

causing the first terminal and the terminal other than the first terminal to perform an encryption communication based on the shared transmission and reception keys, causing the terminal other than the first terminal to generate a third public key and a third private key;

causing the terminal other than the first terminal to create a second shared transmission key based on the third private key and the second public key; and causing the first terminal to create a second shared reception key based on the second private key and the third public key;

wherein a two-way encryption communication occurs between the first terminal and the terminal other than the first terminal based on the first and the second shared transmission and reception keys, and the first shared transmission key differs from the second shared reception key.

2. The encryption communication method according to claim 1, further comprising:

causing a third terminal from among the plurality of terminals to prepare a third public key and a third private key;

causing the second terminal to distribute the second public key and the second private key to the third terminal;

causing the third terminal to create a second shared transmission key used to communicate with an other terminal from among the plurality of terminals based on the third private key and the second public key; and causing the other terminal to create a second shared reception key used to communicate with the third terminal based on the second private key and the third public key.

3. The encryption communication method according to claim 1; wherein the shared keys are created by using DH key exchange.

4. The encryption communication method according to claim 1; wherein a terminal from among the plurality of terminals holds a set of a public key for authentication and a private key for authentication to which a signature of a predetermined certificate authority has been added and adds a signature to information transmitted to a different terminal(s) by using the corresponding public key for authentication.

5. The encryption communication method according to claim 2; wherein the shared keys are created by using DH key exchange.

6. The encryption communication method according to claim 2; wherein an individual one of the two or more terminals holds a set of a public key for authentication and a private key for authentication to which a signature of a predetermined certificate authority has been added and adds a signature to information transmitted to a different terminal(s) by using the corresponding public key for authentication.

7. The encryption communication method according to claim 3; wherein a terminal from among the plurality of terminals holds a set of a public key for authentication and a private key for authentication to which a signature of a predetermined certificate authority has been added and adds a signature to information transmitted to a different terminal(s) by using the corresponding public key for authentication.

8. An information processing apparatus, comprising:
a processor;
a memory storing program code executable by the processor to:
   prepare a first public key and a first private key;
   create a second public key and a second private key;
   distribute the second public and private keys to a different terminal(s) using a predetermined key delivery method;
   create a first shared transmission key based on the first private key and the second public key;
   create a second shared reception key based on the second private key and a third public key generated by the different terminal; and
   perform an encryption communication(s) with the different terminal that creates a first shared reception key based on the second private key and the first public key; and
   create a second shared transmission key based on a third private key generated by the different terminal and the second public key;
wherein a two-way encryption communication occurs between the apparatus and the different terminal based on the first and the second shared transmission and reception keys, and
the first shared transmission key differs from the second shared reception key.

9. The information processing apparatus according to claim 8; wherein the processor performs the encryption communication(s) by causing one information processing apparatus to store encrypted data in a predetermined storage medium and causing a different information processing apparatus(es) to read the encrypted data from the predetermined storage medium and decrypt the encrypted data.

10. An information processing apparatus, comprising:
a processor;
a memory storing program code executable by the processor to:
   prepare a first public key and a first private key;
   receive a second public key and a second private key from a different terminal using a predetermined key delivery method;
   create a first shared transmission key based on the first private key and the second public key;
   create a second shared reception key based on the second private key and a third public key generated by the different terminals; and
   perform an encryption communication(s) with the different terminal that creates a first shared reception key based on the second private key and the first public key; and
   create a second shared transmission key based on a third private key generated by the different terminal and the second public key;
wherein a two-way encryption communication occurs between the apparatus and the different terminal based on the first and the second shared transmission and reception keys, and
the first shared transmission key differs from the second shared reception key.

11. The information processing apparatus according to claim 10; wherein the processor performs the encryption communication(s) by causing one information processing apparatus to store encrypted data in a predetermined storage medium and causing a different information processing apparatus(es) to read the encrypted data from the predetermined storage medium and decrypt the encrypted data.

* * * * *